(12) United States Patent
Buonerba

(10) Patent No.: US 11,643,003 B1
(45) Date of Patent: May 9, 2023

(54) METHOD AND APPARATUS FOR TRANSPORTING LIQUID MATERIALS

(71) Applicant: Bulk Cargo Systems, LLC, Honolulu, HI (US)

(72) Inventor: David Buonerba, Honolulu, HI (US)

(73) Assignee: Bulk Cargo Systems, LLC, Honolulu, HI (US)

( * ) Notice: Subject to any disclaimer, the term of this patent is extended or adjusted under 35 U.S.C. 154(b) by 0 days.

(21) Appl. No.: 17/450,760

(22) Filed: Oct. 13, 2021

(51) Int. Cl.
  *B60P 3/42* (2006.01)
  *B65D 90/04* (2006.01)
  *B65D 88/16* (2006.01)

(52) U.S. Cl.
  CPC .............. *B60P 3/426* (2013.01); *B65D 88/16* (2013.01); *B65D 90/046* (2013.01); *B65D 2588/16* (2013.01); *B65D 2590/046* (2013.01)

(58) Field of Classification Search
  CPC ............ B65D 11/1876; B65D 11/1866; B65D 88/16; B65D 90/046; B65D 90/04; B60P 3/426; B60P 3/42
  USPC .......... 220/1.6, 1.5, 4.16, 4.12, 4.28, 6, 723, 220/720; 248/95; 410/130, 129, 150, 410/143
  See application file for complete search history.

(56) References Cited

U.S. PATENT DOCUMENTS

| | | | | |
|---|---|---|---|---|
| 2,712,797 A | * | 7/1955 | Woehrle | B60P 3/426 52/63 |
| 3,854,544 A | * | 12/1974 | Kolchev | B62B 3/02 220/6 |
| 4,161,263 A | * | 7/1979 | Wagner | B60P 3/426 222/100 |
| 4,541,765 A | * | 9/1985 | Moore | B65D 88/62 222/105 |
| 4,613,053 A | * | 9/1986 | Kimura | B65D 88/121 222/105 |
| 4,911,317 A | * | 3/1990 | Schloesser | B65D 90/046 53/469 |
| 6,015,055 A | | 1/2000 | Bonerb et al. | |
| 6,065,265 A | | 5/2000 | Stenekes | |

(Continued)

FOREIGN PATENT DOCUMENTS

GB 2026985 A * 2/1980 ............. B65D 88/14

OTHER PUBLICATIONS

RYDER® & Eco-TankVan Brochure, 2017.

*Primary Examiner* — Robert J Hicks
(74) *Attorney, Agent, or Firm* — Simpson & Simpson, PLLC

(57) ABSTRACT

A collapsible liquid storage tank for use in an elongated trailer for selectively carrying solid freight and bulk liquid freight, comprising a first side frame configured for movement between a retracted position against a first trailer side wall for carrying solid freight and a deployed position for carrying liquid freight, a second side frame configured for movement between a retracted position against a second trailer side wall for carrying solid freight and a deployed position for carrying liquid freight, a rear frame positioned between the first and second side frames when the first and second side frames are in the deployed position, a liner having side walls connected to the first and second side frames and the rear frame, a liquid impermeable bladder disposed within the liner, and at least one baffle operatively arranged to be positioned between the first and second side frames.

20 Claims, 22 Drawing Sheets

(56) References Cited

U.S. PATENT DOCUMENTS

| | | |
|---|---|---|
| 6,216,900 B1 | 4/2001 | Bonerb et al. |
| 6,299,437 B1 | 10/2001 | Bonerb et al. |
| 2007/0102314 A1* | 5/2007 | Dedmon .............. B65D 77/061 |
| | | 206/386 |

* cited by examiner

METHOD AND APPARATUS FOR TRANSPORTING LIQUID MATERIALS

FIELD

This disclosure relates generally to a method and apparatus for transporting liquid materials by vehicle and more particularly to a method and apparatus for transporting such materials in a trailer that can also be used for transporting conventional dry materials or other non-liquid cargo. More specifically, this disclosure relates to collapsible tanks for freight containers that allow the freight container such as a truck trailer, ocean borne container, railroad car or container, or the like to be converted to selectively carry solid freight or bulk liquid freight. The containers are particularly, but not exclusively useful for liquid edibles and may employ single use liners to eliminate some of the problems associated with heretofore known reusable tanks and liners.

BACKGROUND

Previously used containers, particularly containers that are cleaned between uses must provide access to the inside of the container to permit a person to enter the container and clean the interior thereof. Typically, such containers have used a man port on the upper surface of the container through which a person can enter to clean the container. Thus, the container must be high enough, and the man port big enough to permit entry and cleaning. Increasing the size of a container raises the center of gravity of that container and makes it less stable than desired.

In addition, the transportation of liquids in containers that are attached to a vehicle rather than rigid containers that form an integral part of the vehicle can lead to instability issues associated with sloshing of the liquid. In extreme cases, the sloshing can cause problems in controlling the vehicle. Known transport systems fail to address these problems.

A variety of collapsible tanks of different types are directed to transporting liquid cargo, e.g., the collapsible tanks disclosed in U.S. Pat. No. 6,015,055 (Bonerb et al.), U.S. Pat. No. 6,065,265 (Stenekes), U.S. Pat. No. 6,131,756 (Bonerb et al.), U.S. Pat. No. 6,216,900 (Bonerb et al.), U.S. Pat. Nos. 6,299,437, and 8,132,686 (Buonerba et al.). While the collapsible containers described in these patents have been successful to varying degrees, and have provided some advantages over liquid transfer vessels used in the past, there remains a need for containers that are especially adapted for use in transporting liquids, including but not limited to liquid food/beverage products and liquid chemicals, which containers are inexpensive, are extremely clean, eliminate the need for cleaning between loads, are lighter than previously known containers thereby permitting transport of higher payloads, are made from recyclable materials, have a low carbon footprint, have a low center of gravity, reduce or eliminate the effects of sloshing of liquids during transport, improve driver safety and can be more easily, more safely, and more quickly converted between a liquid carrier and a dry freight carrier. The present disclosure addresses improving these characteristics of containers for transporting liquids.

As described above, containers for transporting liquids, especially containers convertible between liquid transport and dry freight transport have employed a reusable (after cleaning) flexible inner liner and a flexible outer shell attached to top and bottom frame portions of a selectively deployable tank. The tanks so constructed have been configured with a man-sized opening in the top of the inner liner to permit a person to enter the tank for cleaning and have necessarily been high enough for a person to enter and clean the tank from the inside. The center of gravity of such tanks is higher than would otherwise be desirable because of the height requirements for cleaning. More specifically, local occupational safety and health regulations in some countries have required that such tanks be at least four (4) feet high to permit a person to enter the tank for cleaning and/or inspection for cleanliness.

Cleaning the known tank configurations between uses adds considerable extra expense. The cost to enter and clean a tank can be in excess of hundreds of dollars per cleaning. The cost is due in part to the need to reposition the carrier from the liquid cargo discharge location to a wash facility and subsequently to a dry freight loading point. In addition to the actual wash charge, the time to dry the cleaned tank, and time to seal the openings, valves, and hoses for reloading increase the cost.

During cleaning of previously used tanks, a person may be required to climb to the top of a conventional tanker, possibly twelve (12) feet or higher, to either enter the tank through the man way for inspection or to take samples of the product prior to unloading. This operation is unnecessary using embodiments of the present disclosure.

In addition to the expense, cleaning known tanks requires considerable amounts of water, often potable water, and cleaners, and produces effluents that must be disposed of in accordance with local requirements. In short, this cleaning operation further increases the cost of using known containers. As with other issues described above, embodiments of the present disclosure overcome these issues.

Known tanks weigh hundreds of pounds or more and this weight limits the amount of liquid that can be carried in trucks with a fixed maximum gross weight. In other terms, weight consumed by the tank itself decreases the amount of transportable product.

Known reusable tanks have been fabricated in various standard sizes that do not always match the amount of liquid transported in any particular load. This creates the possibility of transporting a less than full tank in which in turn promotes liquid sloshing as the transport vehicle moves. In many cases, this reduces vehicle stability. Aspects of the present disclosure use several techniques for reducing the effects of sloshing liquid.

As can be derived from the variety of devices and methods directed at transporting liquid cargo, many means have been contemplated to accomplish the desired end, i.e., safe, sanitary, and cost-effective shipments. Heretofore, tradeoffs between safety, convenience and cost were required.

SUMMARY

According to aspects illustrated herein, there is provided a collapsible liquid storage tank for use in an elongated trailer for selectively carrying solid freight and bulk liquid freight, comprising a first side frame extending longitudinally with respect to the elongated trailer and movably attached to the elongated trailer, the first side frame is configured for movement between a retracted position against a first trailer side wall for carrying solid freight and a deployed position for carrying liquid freight, a second side frame extending longitudinally with respect to the elongated trailer and movably attached to the elongated trailer, the second side frame is configured for movement between a retracted position against a second trailer side wall for carrying solid freight and a deployed position, for carrying liquid freight, parallel to and spaced apart from the first side frame, a rear frame positioned between the first and second side frames when the first and second side frames are in the deployed position, a liner having side walls connected to the first and second side frames and the rear frame, a liquid impermeable bladder disposed within the liner, and at least one baffle operatively arranged to be positioned between the first and second side frames.

According to aspects illustrated herein, there is provided a collapsible liquid transporting tank system for use in an elongated trailer, comprising a first side wall movably connected to the elongated trailer, a second side wall movably connected to the elongated trailer, at least one gate portion connected to one of the first side wall and the second side wall, the at least one gate portion forming a rear wall, and a bladder arranged within the first side wall, the second side wall, and the rear wall when the first and second side walls are in a deployed position.

According to aspects illustrated herein, there is provided a collapsible liquid storage tank for use in an elongated trailer for selectively carrying solid freight and bulk liquid freight, comprising a first side frame extending longitudinally with respect to the elongated trailer and movably attached to the elongated trailer, the first side frame is configured for movement between a retracted position against a first trailer side wall for carrying solid freight and a deployed position for carrying liquid freight, a second side frame extending longitudinally with respect to the elongated trailer and movably attached to the elongated trailer, the second side frame is configured for movement between a retracted position against a second trailer side wall for carrying solid freight and a deployed position, for carrying liquid freight, parallel to and spaced apart from the first side frame, a rear frame positioned between the first and second side frames when the first and second side frames are in the deployed position, a flexible liner having side walls connected to the first and second side frames, a liquid impermeable bladder disposed within the liner, and a plurality of layers of energy absorbing material disposed on and within an upper surface of the bladder arranged to form a plurality of sections of the bladder.

According to aspects illustrated herein, there is provided a collapsible liquid storage tank for use in an elongated trailer for selectively carrying solid freight and bulk liquid freight. The collapsible liquid storage tank comprises a generally rectangular first side frame, a generally rectangular second side frame, a generally rectangular front frame, a flexible fabric liner, a liquid impermeable bladder, at least one baffle and a cover. The generally rectangular first side frame extends longitudinally with respect to the elongated trailer and is movably attached to the elongated trailer. The first side frame is configured for movement between a retracted position against a first trailer side wall for carrying solid freight and a deployed position for carrying liquid freight. The generally rectangular second side frame extends longitudinally with respect to the elongated trailer and is movably attached to the elongated trailer. The second side frame is configured for movement between a retracted position against a second trailer side wall for carrying solid freight and a deployed position, for carrying liquid freight, parallel to and spaced apart from the first side frame. The generally rectangular front frame is positioned between the first and second side frames when the first and second side frames are in the deployed position. The flexible fabric liner includes side walls connected to the first and second side frames, a first end wall connected to the front frame. The liquid impermeable bladder is disposed within the fabric liner. The at least one baffle is positioned between the first and second side frames, while the cover is attached to the side frames and covers the liquid impermeable bladder.

The present disclosure broadly comprises a collapsible liquid storage tank for use in an elongated trailer for selectively carrying solid freight and bulk liquid freight. The collapsible liquid storage tank comprises a generally rectangular first side frame, a generally rectangular second side frame, a generally rectangular front frame, a flexible fabric liner, a liquid impermeable bladder, at least one baffle, and a cover. The generally rectangular first side frame extends longitudinally with respect to the elongated trailer and is movably attached to the elongated trailer. The first side frame is configured for movement between a retracted position against a first trailer side wall for carrying solid freight and a deployed position for carrying liquid freight. The generally rectangular second side frame extends longitudinally with respect to the elongated trailer and is movably attached to the elongated trailer. The second side frame is configured for movement between a retracted position against a second trailer side wall for carrying solid freight and a deployed position, for carrying liquid freight, parallel to and spaced apart from the first side frame. The generally rectangular front frame is positioned between the first and second side frames when the first and second side frames are in the deployed position. The flexible fabric liner includes side walls connected to the first and second side frames, and a first end wall connected to the front frame. The liquid impermeable bladder is disposed within the fabric liner. The at least one baffle is positioned between the first and second side frames while the cover is attached to the side frames and covers the liquid impermeable bladder.

The present disclosure further broadly comprises a collapsible liquid storage tank for use in an elongated trailer for selectively carrying solid freight and bulk liquid freight. The collapsible liquid storage tank comprises a generally rectangular first side frame, a generally rectangular second side frame, a generally rectangular front frame, a flexible fabric liner, a liquid impermeable bladder, and a plurality of layers of energy absorbing material. The generally rectangular first side frame extends longitudinally with respect to the elongated trailer and is movably attached to the elongated trailer. The first side frame is configured for movement between a retracted position against a first trailer side wall for carrying solid freight and a deployed position for carrying liquid freight. The generally rectangular second side frame extends longitudinally with respect to the elongated trailer and is movably attached to the elongated trailer. The second side frame is configured for movement between a retracted position against a second trailer side wall for carrying solid freight and a deployed position, for carrying liquid freight, parallel to and spaced apart from the first side frame. The generally rectangular front frame is positioned between the first and second side frames when the first and second side frames are in the deployed position. The flexible fabric liner includes side walls connected to the first and second side frames, and a first end wall connected to the front frame. The liquid impermeable bladder is disposed within the fabric liner. The plurality of layers of energy absorbing material are disposed on and within an upper surface of the bladder arranged to form a plurality of sections of the bladder.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
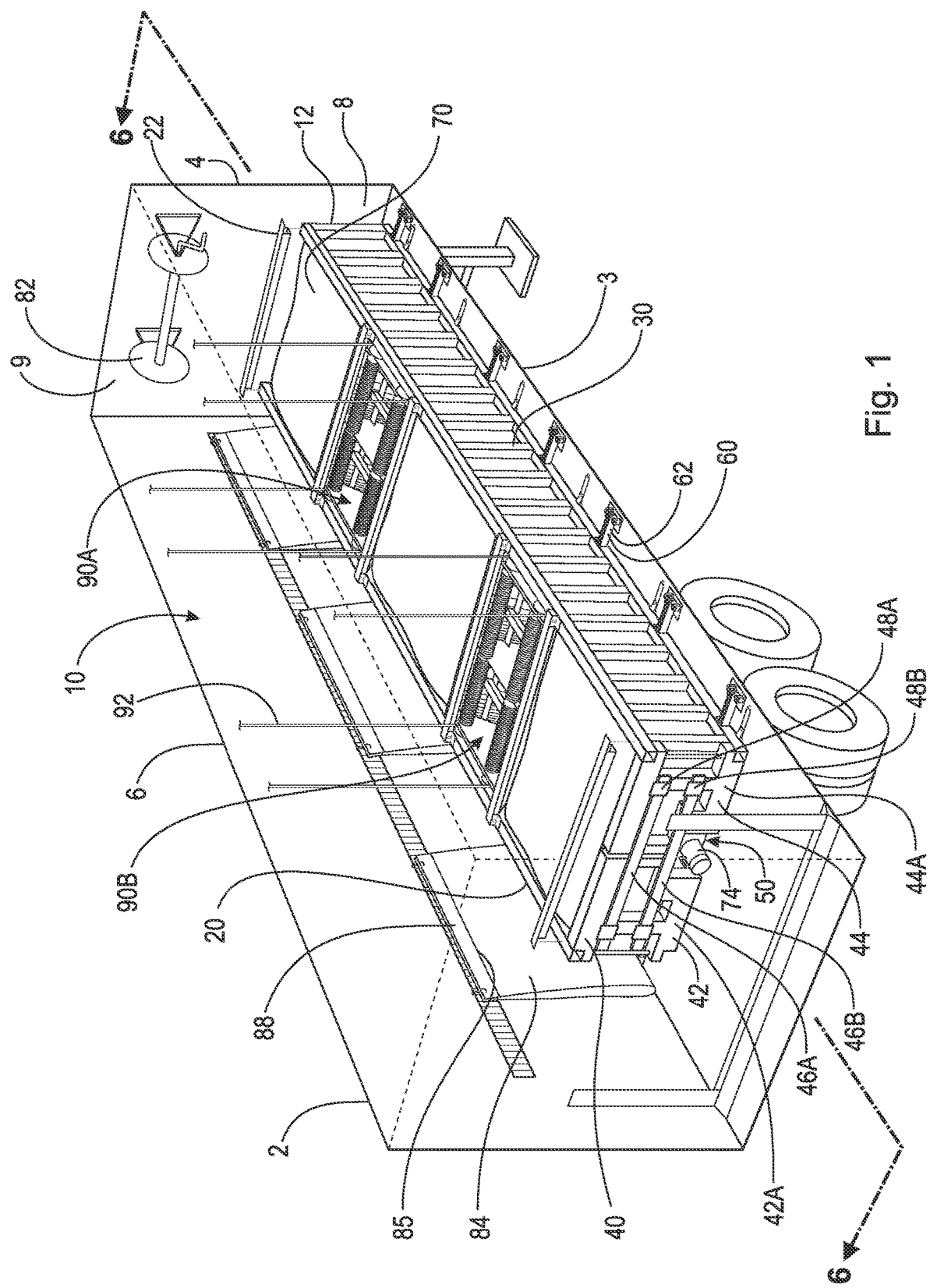
FIG. 1 is a perspective view of a tractor trailer, partly in phantom, showing a tank in accordance with one aspect of this disclosure configured for transporting liquid cargo.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Broadly, embodiments of the present disclosure comprise a retractable frame having a liner, a bladder arranged to receive a fluid therein, at least one baffle, and a cover. It should be appreciated that the present disclosure may include additional elements, e.g., baffle lifts, and/or variations of the foregoing elements, e.g., metal core baffles and open cell foam baffles, as described in greater detail below.

Adverting now to the figures, an embodiment of a present apparatus for transporting liquid is illustrated in FIG. 1. Liquid transporting tank system 10, in accordance with an aspect of the present disclosure, is illustrated as it could be installed in trailer 2 of a tractor-trailer truck (not shown). Tank 70 is contained within first and second sidewalls 20 and 30, respectively, and front and rear end walls 12 and 40, respectively, that together form a generally rectangular enclosure. Preferably, sidewalls 20 and 30 are attached to the trailer body by movable supports that can change sidewalls 20 and 30 from a deployed position, as shown in FIG. 1, to a stowed position, as shown and described in more detail in connection with FIG. 2. Movable supports 60 are configured so that when stowed, sidewalls 20 and 30 are positioned generally adjacent to sidewalls 6 and 8, respectively, of trailer 2 so as to occupy as little space as possible. Rear end wall 40 may be formed from gate portions 42 and 44 attached to side walls 20 and 30, respectively. Front end wall 12 may be formed from front wall 4 of trailer 2 or a separate front wall panel may be used. When front end wall 12 is formed by front wall 4 of trailer 2, side walls 20 and 30 should be positioned that when in the deployed configuration, the front ends of side walls 20 and 30 are close to or in contact with front wall 4 of trailer 2.

Figure 4:
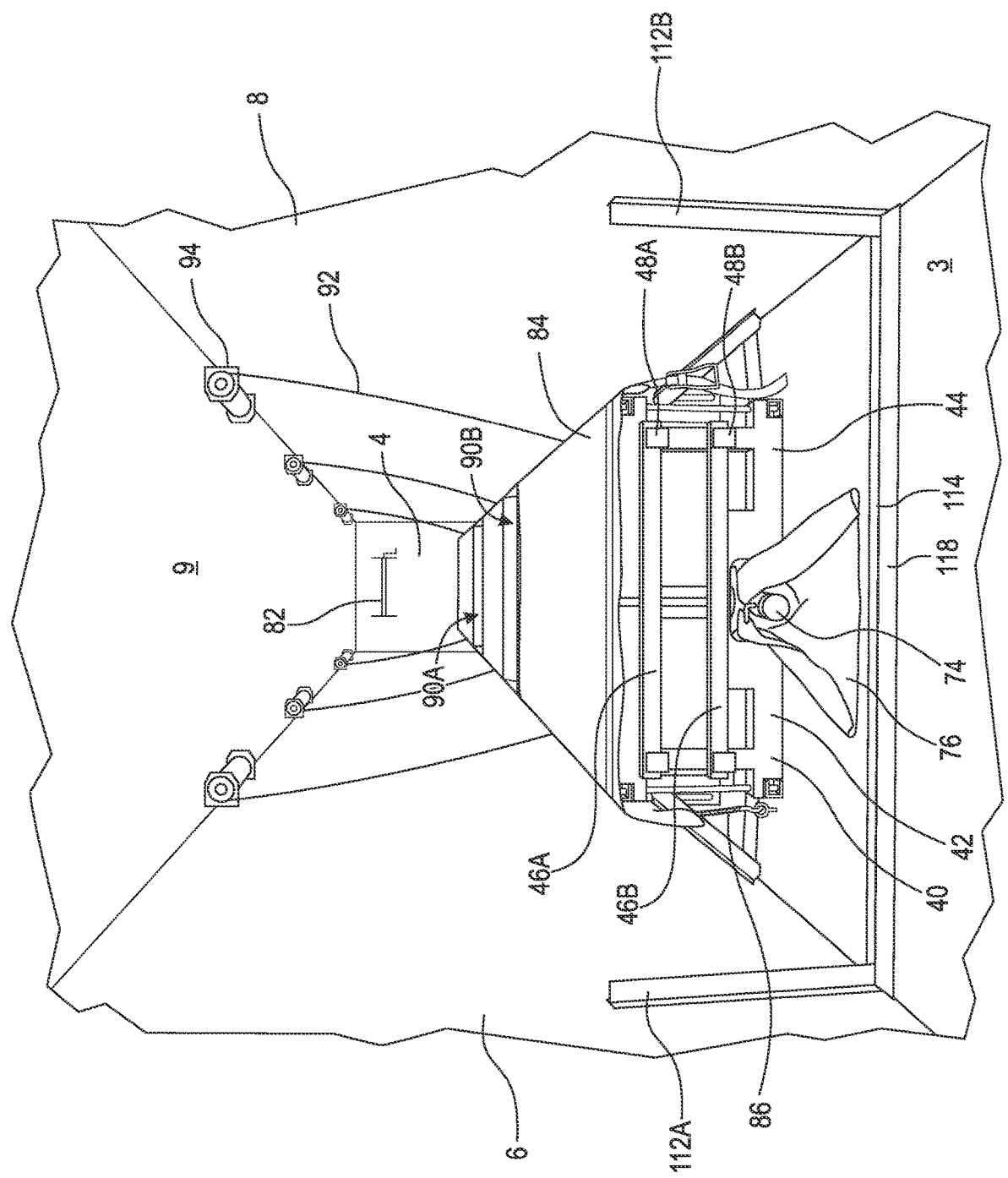
FIG. 4 is a rear view of the trailer of FIG. 1 showing the tank configured for loading or unloading liquid cargo.
Figure 5:
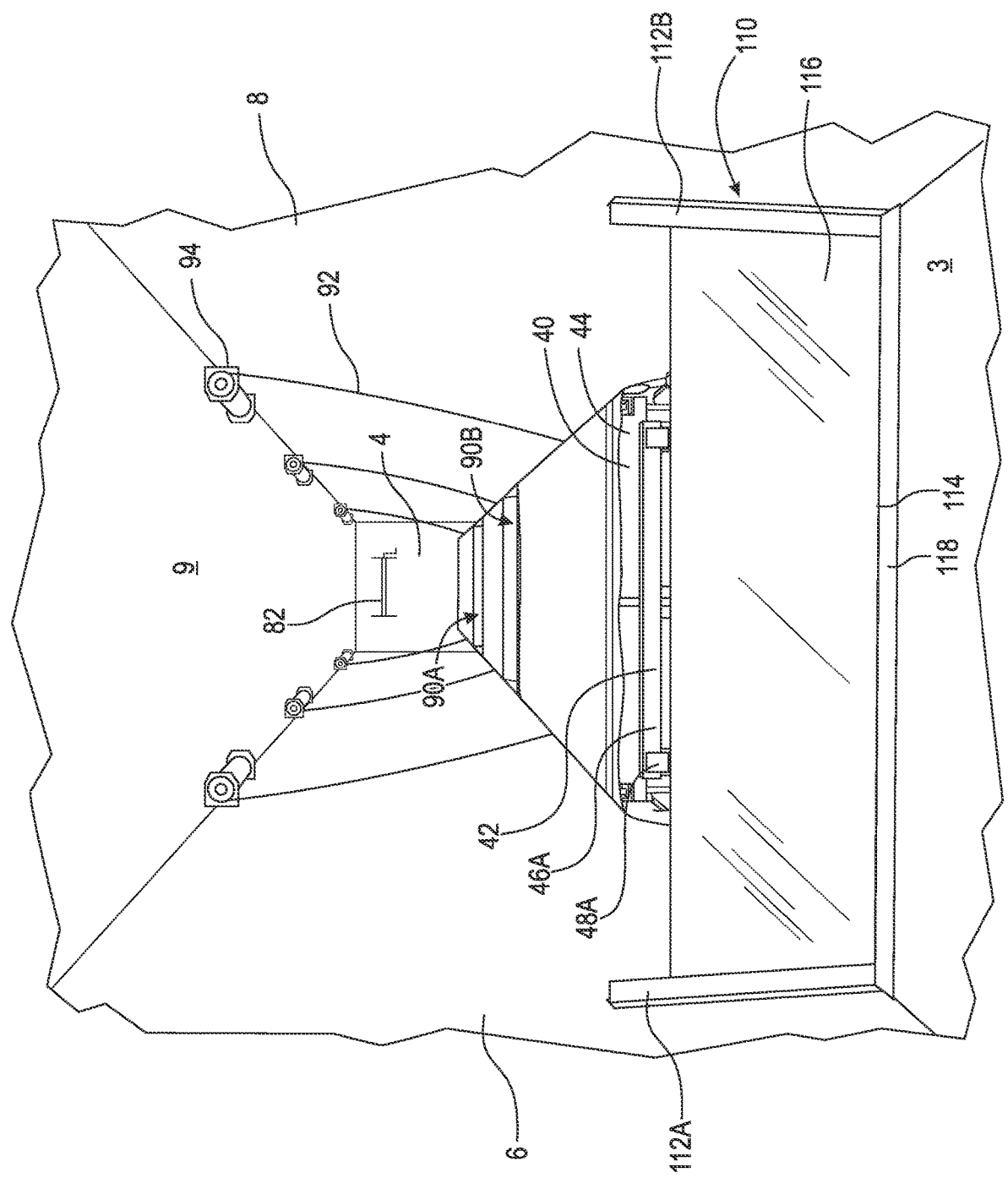
FIG. 5 is a rear view of the trailer of FIG. 1 showing the tank configured for transporting liquid cargo with a safety panel in place.
Figure 6:
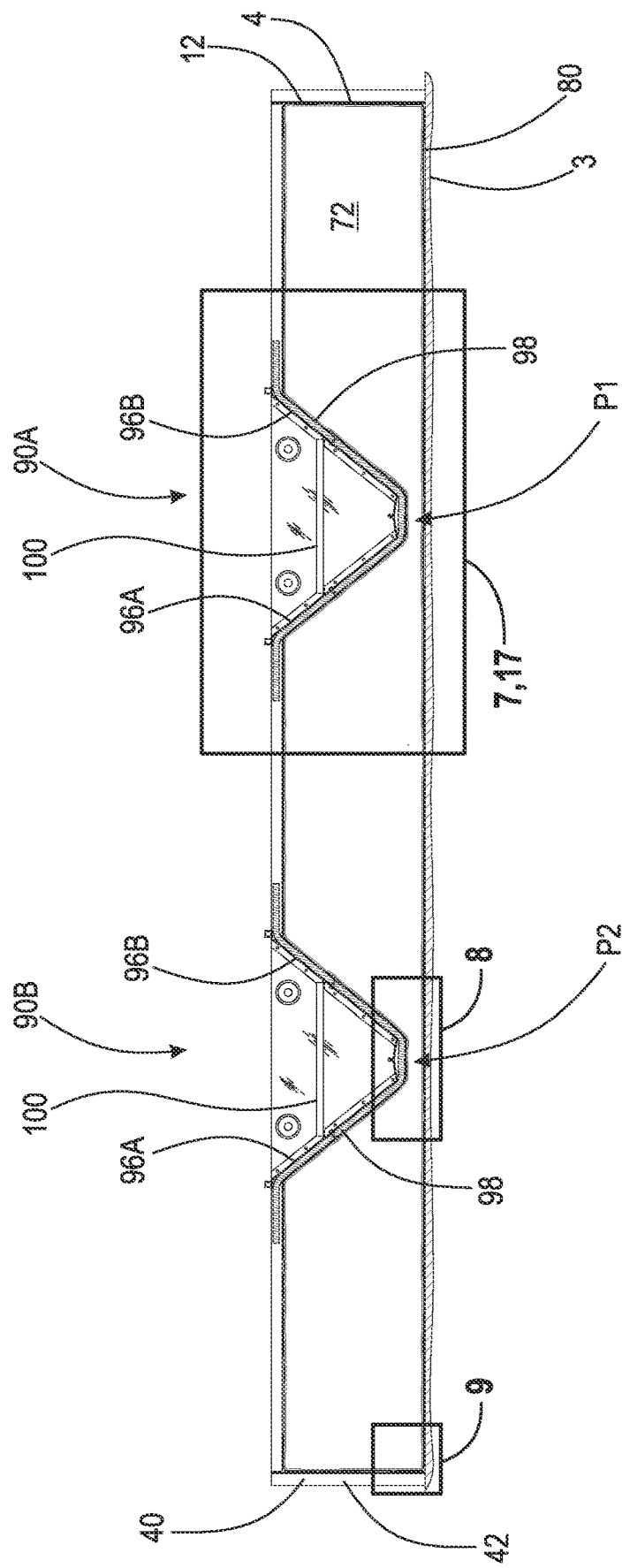
FIG. 6 is a cross-sectional view of the trailer taken generally along line 6-6 in FIG. 1, showing the construction of the baffles disposed in the tank.
Figure 7:
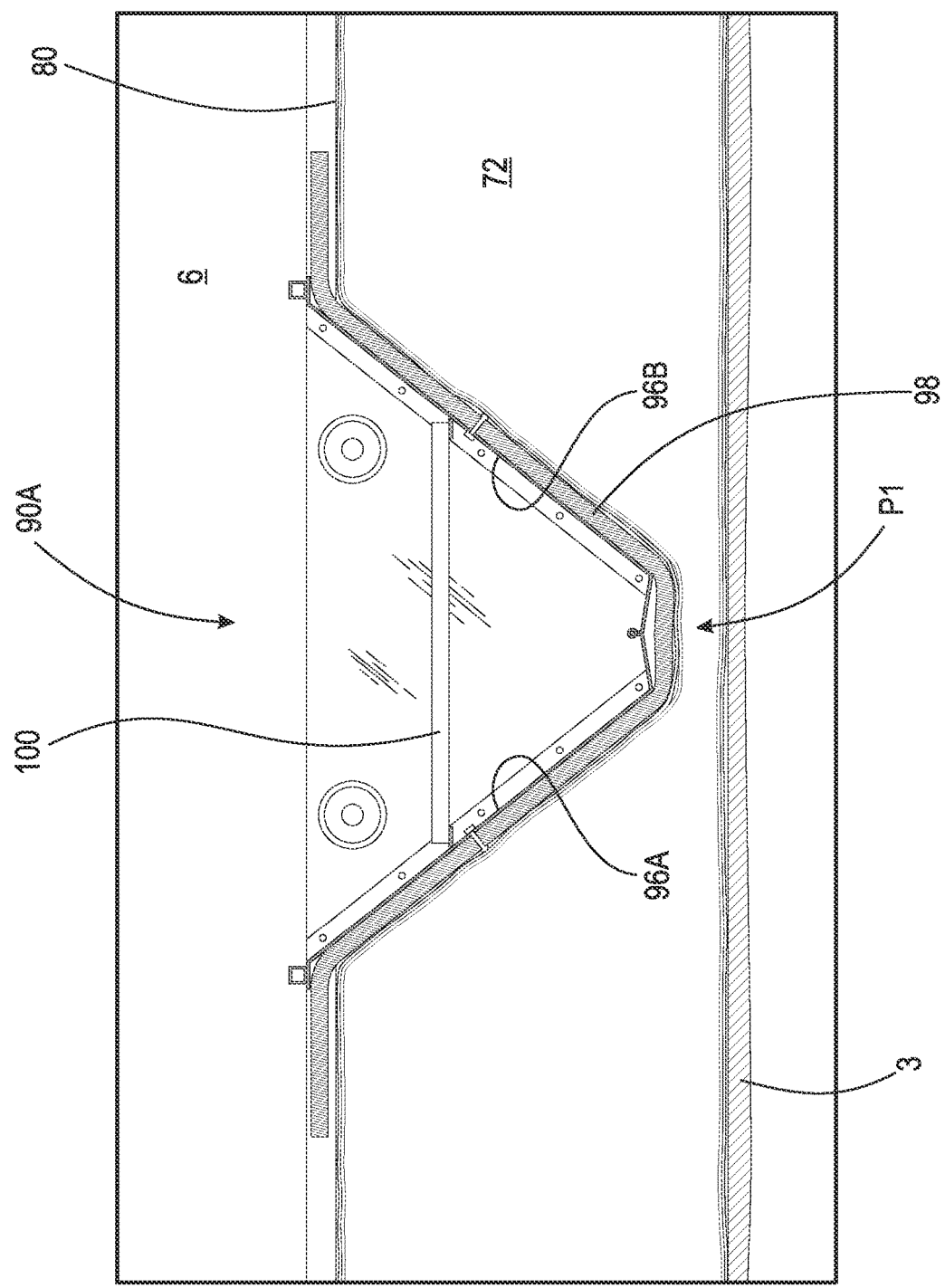
FIG. 7 is an enlarged view of one of the baffles, taken generally at detail 7 in FIG. 6.
Figure 8:
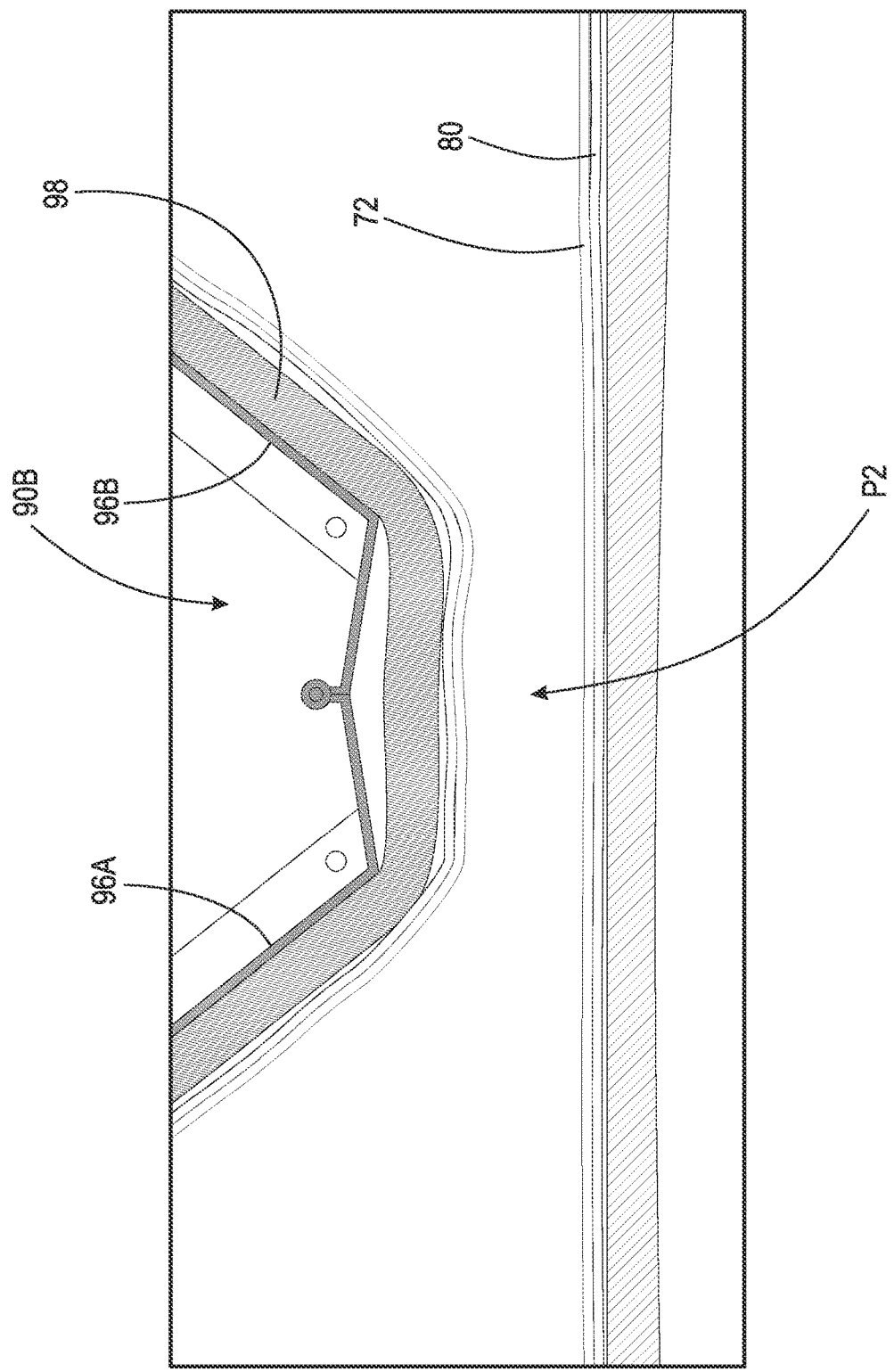
FIG. 8 is an enlarged view of the bottom portion of the baffle, taken generally at detail 8 in FIG. 6.
Figure 9:
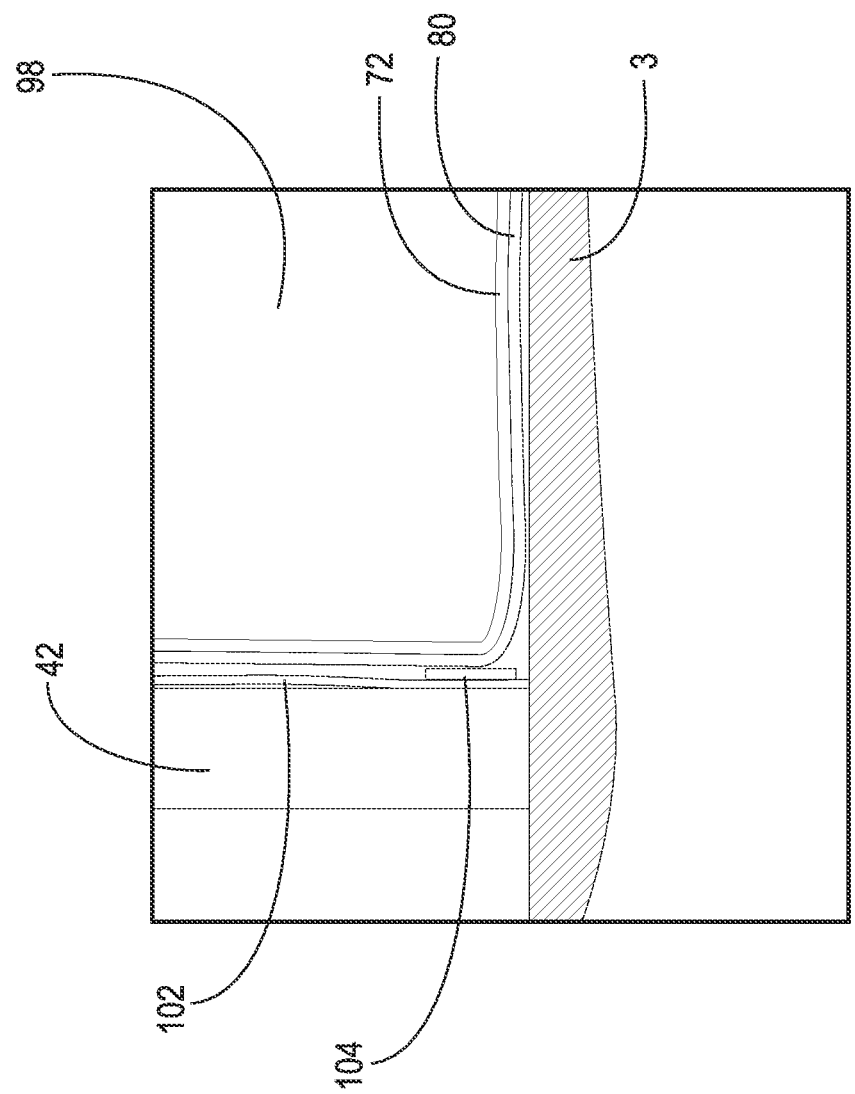
FIG. 9 is an enlarged view of the trailer, taken generally at detail 9 in FIG. 6.

In some embodiments, rear wall 40 is formed from two gate portions, namely gate portions 42 and 44, pivotally attached to the rear ends of sidewalls 20 and 30, respectively. Gate portions 42 and 44 move between an open position (see FIGS. 2 and 5) generally aligned with sidewalls 20 and 30 for storage and a closed position (see FIGS. 1 and 4) during transport. In some embodiments, gate portions 42 and 44 are retained in the closed position by first and second transverse bars 46A and 46B, that rest in supports 48A and 48B, respectively, attached to rear surface 42A and 44A of gate portions 42 and 44, respectively. When gate portions 42 and 44 are closed, rear end wall 40 includes opening 50 through which port or fitting 74 protrudes for filling and emptying bladder 72 of liquid transporting tank system 10. Port 74 is attached to the end of bladder 72 as will be described in more detail below. In some embodiments, port 74 does not extend through opening 50.

In some embodiments, sidewalls 20 and 30 are attached to cables (not shown), rods 62 or similar structures that assist in raising sidewalls 20 and 30 from the deployed position to the stored position. The cables may be attached to coil springs, e.g., torsion springs, mounted at an upper portion of sidewall 6 and/or sidewall 8 of trailer 2 to balance the weight of side walls 20 and 30 so that an operator can easily move sidewalls 20 and 30 between the deployed position and the stored position. The springs could take other forms and/or be motorized if desired, for example, a fully automated lift assist. Preferably, the lift mechanism substantially balances the weight of sidewalls 20 and 30 to make movement between the deployed and stowed positions as easy and convenient as possible. In accordance with some embodiments, motors, such as electric or hydraulic motors may be utilized to raise and lower sidewalls 20 and 30 without operator assistance, or with minimal operator assistance.

In some embodiments, tank 70 is divided into two or more sections, e.g., three sections, by movable baffles 90A and 90B that are positioned transversely in tank 70, as shown in FIG. 1. Baffles 90A and 90B extend substantially from the top of the supporting structure, i.e., first and second sidewalls 20 and 30, respectively, and front and rear end walls 12 and 40, respectively, downwardly towards base or floor 3 of trailer 12. Preferably, baffles 90A and 90B do not extend completely to floor 3 so that passage P1 and/or passage P2 arranged to allow liquid to move between the sections of tank 70 is created. This allows tank 70 to be filled and emptied from a single fitting, e.g., port 74, located at the rear of tank 70. In some embodiments, baffles 90A and 90B are V-shaped or substantially V-shaped, and in some embodiments, include supports on the interior of baffles 90A and 90B to maintain their shape when tank 70 is filled. Baffles 90A and 90B may be raised and lowered by cables 92 attached to the body of trailer 12, e.g., from the upper portion of sidewalls 6 and 8 or ceiling 9 of trailer 12. These embodiments allow baffles 90A and 90B to be moved to a position in which they will not interfere with dry cargo DC transported by trailer 12 (see FIG. 2). In some embodiments, the baffles may be installed and removed by hand, i.e., no attached cables. In such embodiments, baffles 90A and 90B must be constructed such that an operator can lift baffles 90A and 90B without additional assistance. Some of the embodiments of various structures and forms of baffles are described in greater detail below.

While the front wall of tank 70 may be a separate element, in some embodiments, front wall 4 of trailer 12 may be used to contain the liquid contents. In some of these embodiments, supporting beam 22 may be attached to sidewalls 20 and 30 of tank 70 at the forward most position to assist with holding sidewalls 20 and 30 in position.

Figure 2:
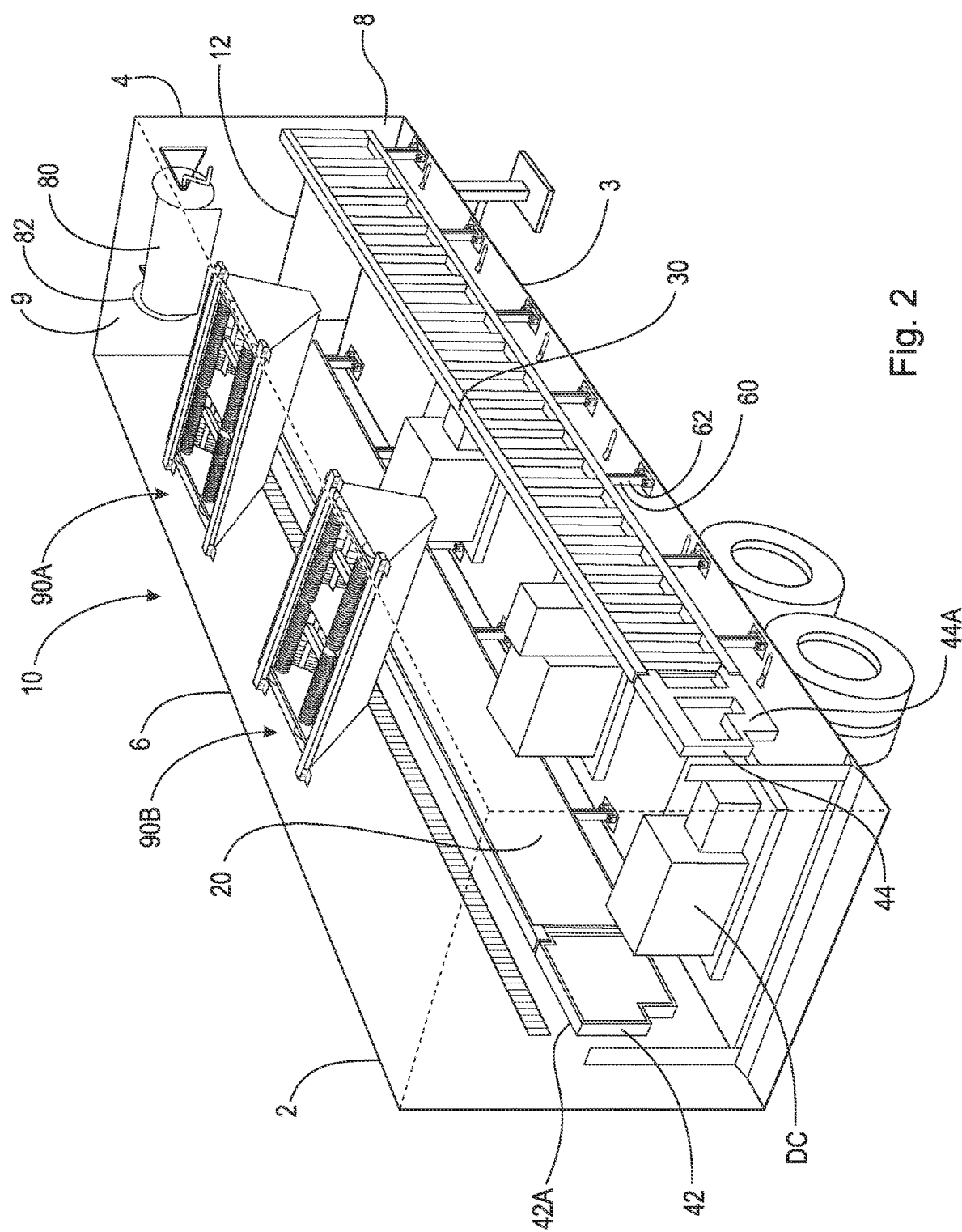
FIG. 2 is a perspective view of the trailer of FIG. 1 showing the configuration for transporting dry cargo.

FIG. 2 is a diagrammatic view of an embodiment of the present disclosure shown and described in connection with FIG. 1, but in a stowed configuration in which dry cargo DC can be transported. As can be seen in FIG. 2, rear gate portions 42 and 44 are moved to an open position parallel to sidewalls 20 and 30, respectively, and the combination of sidewalls 20 and 30 and rear gate portions 42 and 44 are raised to the stowed position preferably with sidewalls 20 and 30 and rear gate portions 42 and 44 positioned as close to walls 6 and 8 of trailer 2 as possible to maximize the usable space therebetween to facilitate loading and unloading of dry cargo DC. Baffles 90A and 90B are raised to a position near top or ceiling 9 of trailer 2, clear of the dry cargo holding area. In some embodiments, sidewalls 20 and 30 are supported on pivoting rods 62 that move from the position shown in FIG. 1 to the position shown in FIG. 2 as sidewalls 20 and 30 are raised. In some embodiments, cables (not shown) may be used to assist with lifting sidewalls 20 and 30 via motors, torsion springs, etc.

As can be seen clearly in FIG. 2, the inside surfaces of sidewalls 20 and 30 and rear gate portions 42 and 44 of liquid transporting tank system 10 are covered with an inelastic material, e.g., a KEVLAR® fabric, that while flexible, is substantially inelastic so that it contains liner 80 and inner bladder 72.

In some embodiments, when inner bladder 72 is removed and discarded after transporting a load of liquid, liner 80 may be rolled onto spool 82 mounted at or on front wall 4 of trailer 2. Spool 82 is shown in FIGS. 1 and 2.

Figure 10:
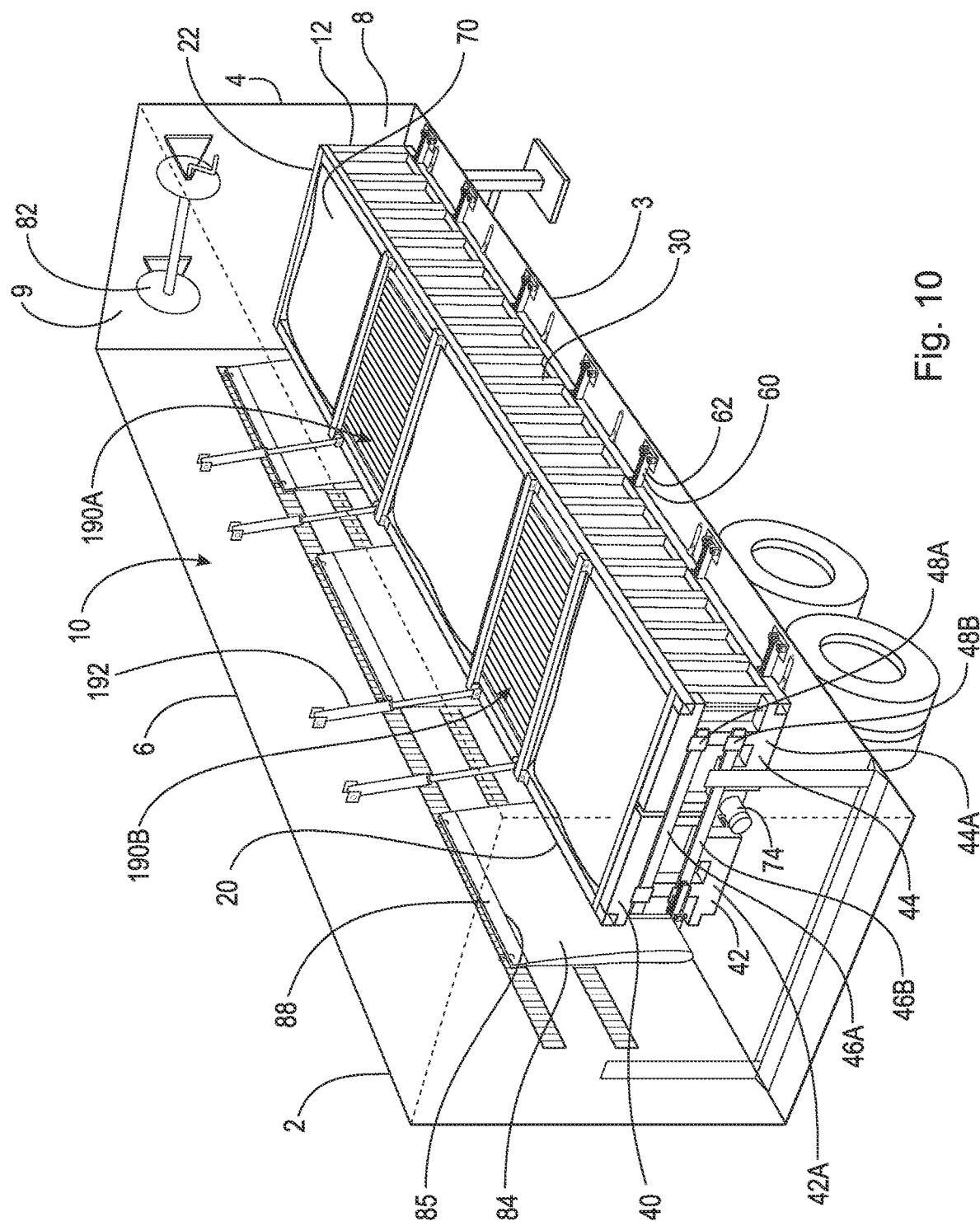
FIG. 10 is a perspective view of a tractor trailer, partly in phantom, showing a tank in accordance with another aspect of this disclosure configured for transporting liquid cargo.
Figure 11:
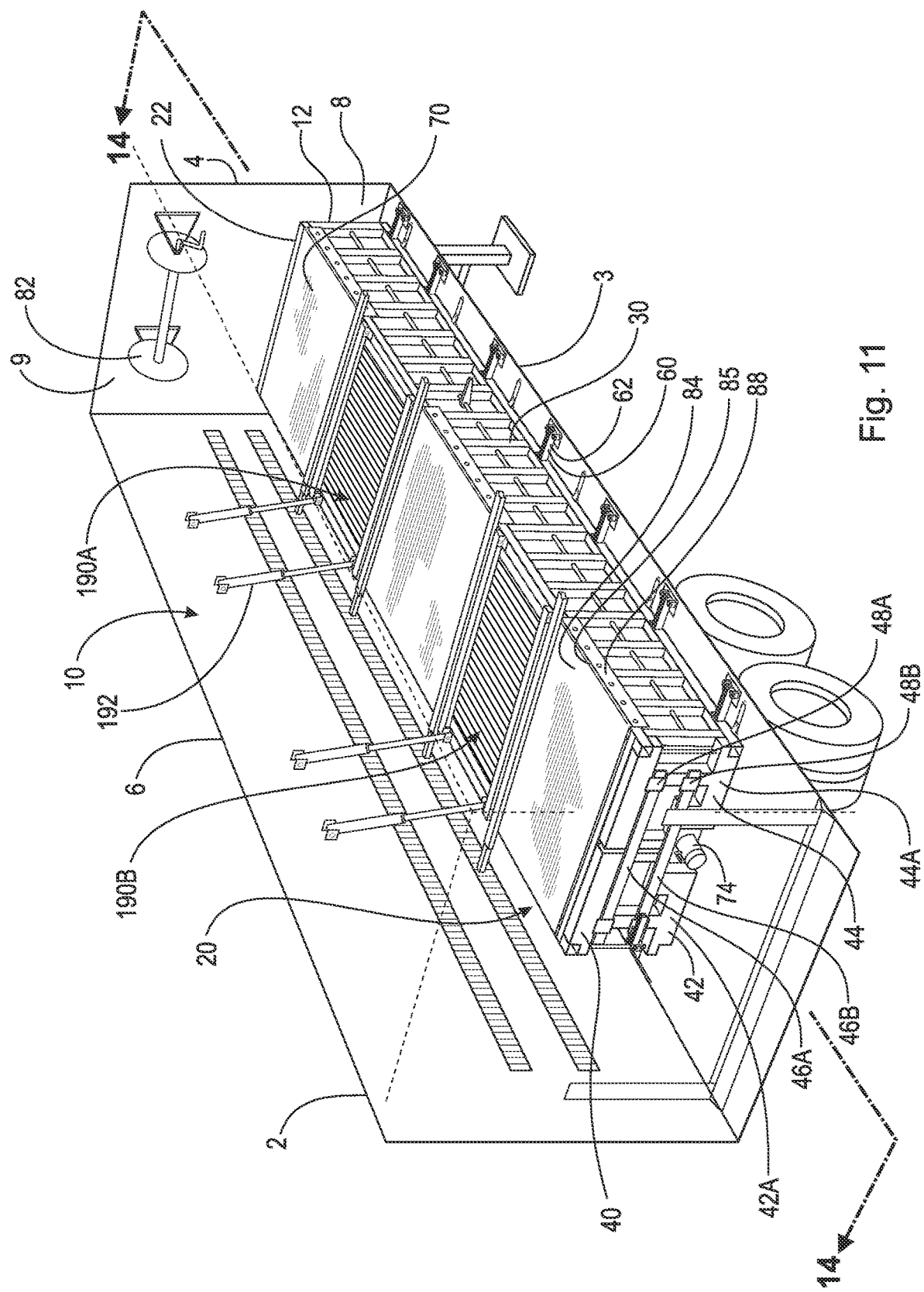
FIG. 11 is a perspective view of the trailer of FIG. 10 configured for transporting liquid cargo.
Figure 12:
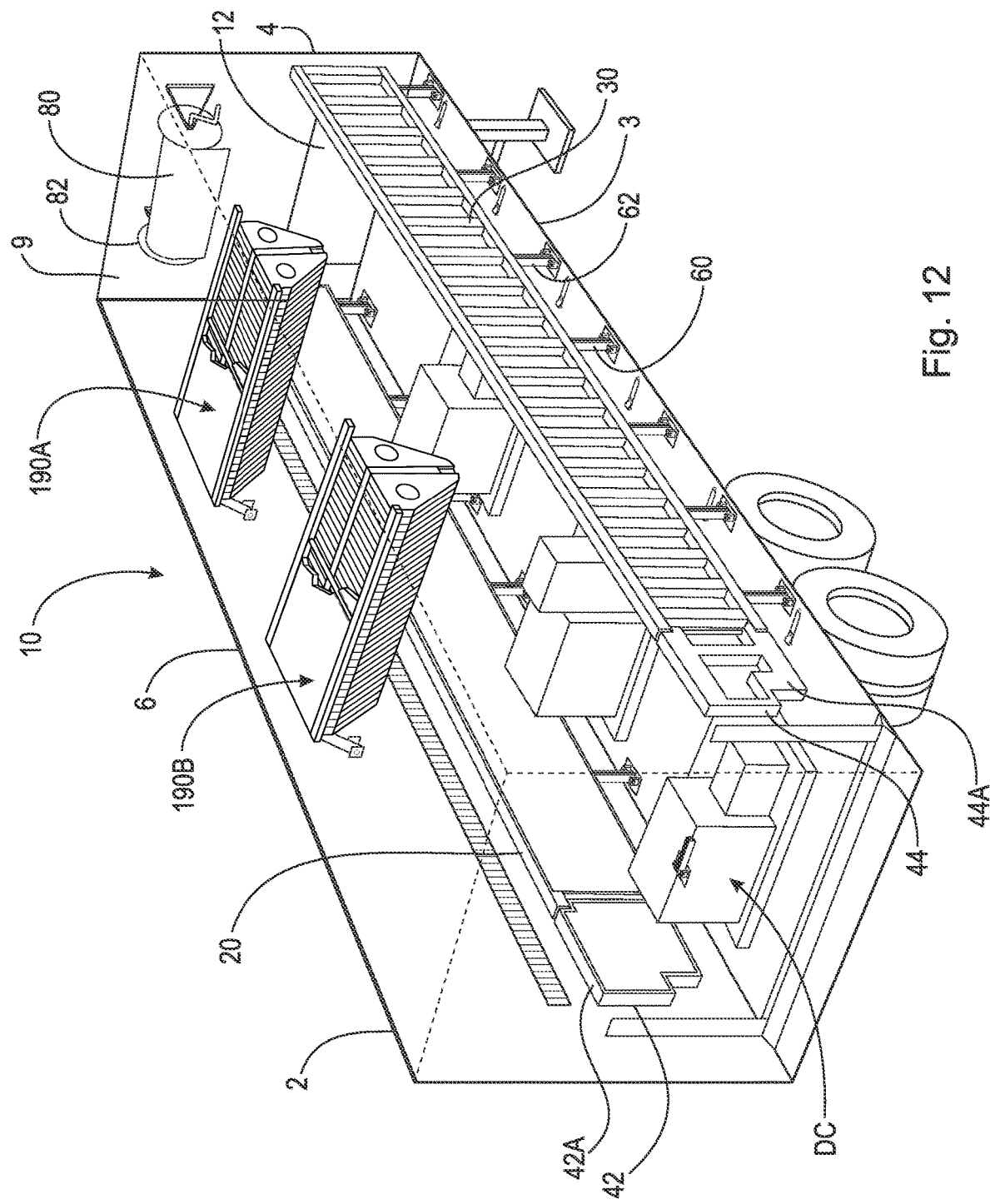
FIG. 12 is a perspective view of the trailer of FIG. 10 showing the configuration for transporting dry cargo.
Figure 13:
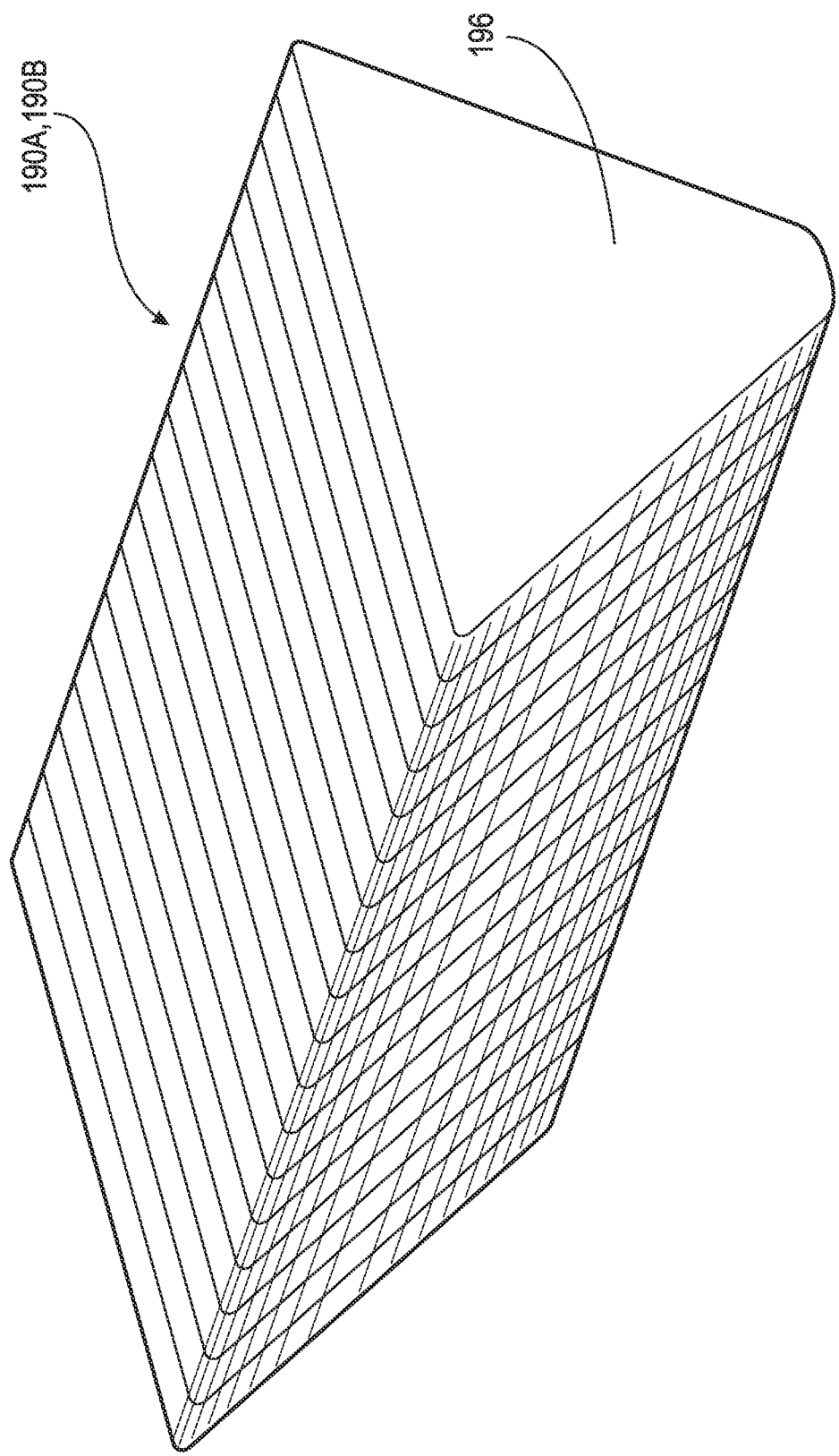
FIG. 13 is a perspective view of a baffle.
Figure 14:
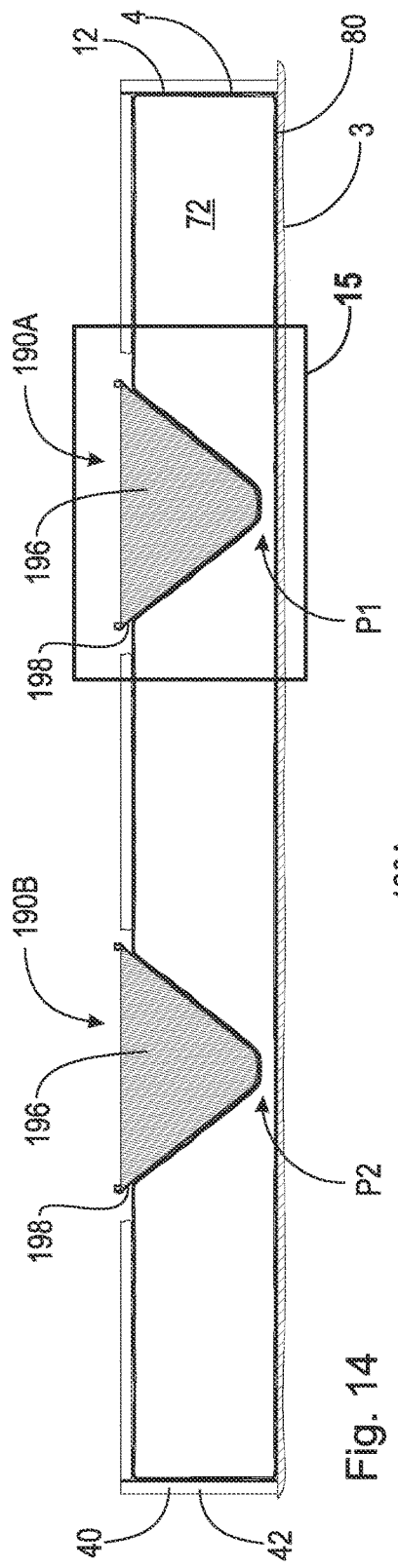
FIG. 14 is a cross-sectional view of the trailer taken generally along line 14-14 in FIG. 11.
Figure 15:
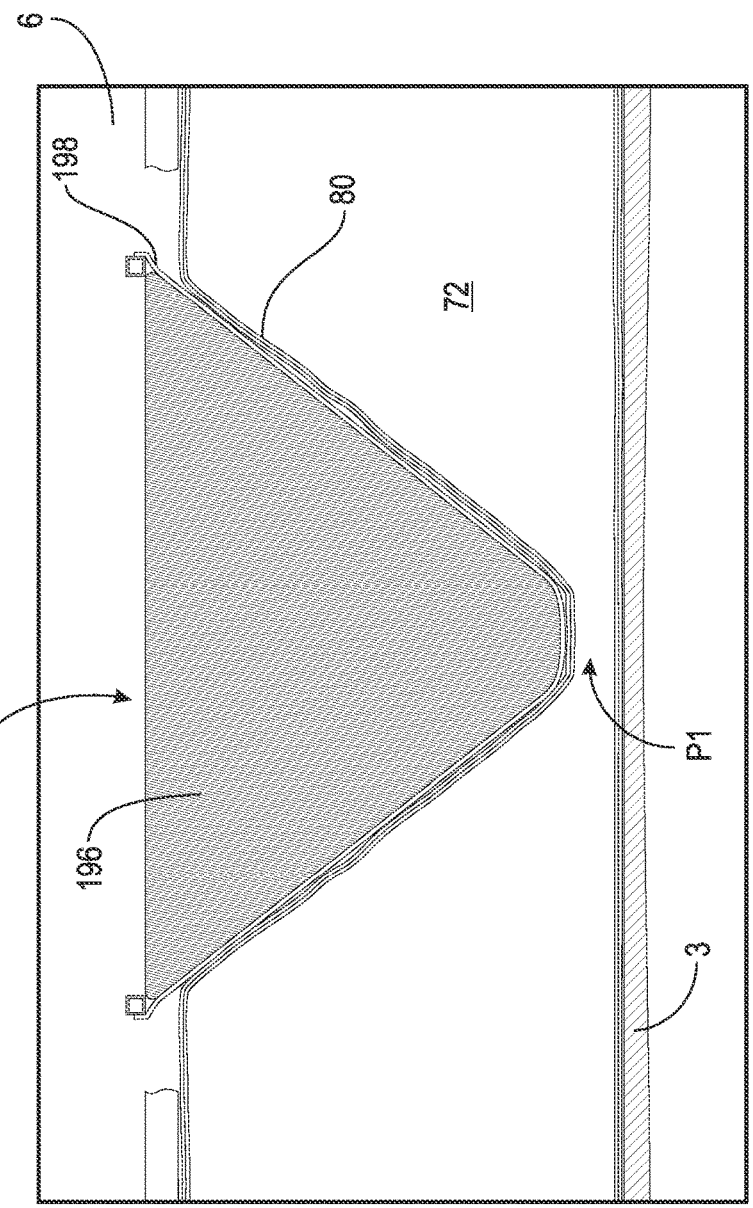
FIG. 15 is an enlarged view of one of the baffles, taken generally at detail 15 in FIG. 14.

Some of the features described above may be seen more clearly in FIGS. 3-5, which is a perspective view from the rear of trailer 2 carrying a tank in accordance with various aspects of the present disclosure. A fluid resistant piece of preferably flexible material, e.g., plastic cover 76 is attached around filling/emptying port or fitting 74 to prevent any drips or small spills from contaminating the inside of trailer 2. The portions of tank 70 between baffles 90A and 90B are each covered by a sheet or strap of material, for example, sheet 84, that is arranged from side to side over the top of the tank. In some embodiments, the material is nonstretchable and may be made, for example, from KEVLAR® fabric. In the embodiment depicted in FIGS. 1 and 4-5, three pieces of material are used to cover the three sections of the tank between the rear wall and the front wall of trailer 2. In some embodiments, each section of material is attached to trailer 2, e.g., to floor 3, by straps/cables 86 that, in some embodiments, are tensioned to hold the sheets of material in place, e.g., tensioned with ratcheting pull also commonly known as a come along. In some embodiments, edges 85 of sheets of material 84 are connected to elongated bar 88 which is preferably substantially rigid and to which tie-downs or other similar securement means are attached to maintain tension on sheets 84 (see FIGS. 1 and 10-11). As stated above, springs and cables, used to assist with raising sidewalls 20 and 30 from the deployed position to the stowed position may be used. If a coil spring, e.g., torsion spring, is used, it may be secured to bracket at one end and to a rod that is connected to pulley at a second end. The cable winds around a pulley as sidewalls 20 and 30 are lifted thereby assisting in the lifting. In some embodiments, baffles 90A and 90B are connected through cables 92 to spools arranged to assist with raising baffles 90A and 90B from the deployed position to the retracted position clear of dry cargo DC within trailer 2. Pulleys 96 may be connected to baffles 90A and 90B, and cables 92 engaged pulleys 96 to raise and lower baffles 90A and 90B. Baffles 90A and 90B may be raised and lowered with assistance from springs similar to sidewalls 20 and 30, or alternatively or in combination with the springs, may be raised and lowered by motors. In some embodiments, spools are wound and unwound to raise and lower baffles 90A-B, respectively. Depending upon the strength of the trailer construction, it may be desirable to install further supports along the top and/or sides of the trailer from which side walls 20 and 30 and baffles 90A and 90B may be raised and lowered.

In some embodiments, sidewalls 20 and 30 and gate portions 42 and 44 are fabricated from lightweight material such as aluminum and arranged in a lattice and/or solid panels. As described above, sidewalls 20 and 30 and gate portions 42 and 44 are lined with a flexible but nonstretchable material such as KEVLAR® fabric.

While the present disclosure tank is designed to prevent leakage of liquid from the tank 70 into the body of trailer 2, in some instances, liquid may leak into the body of the trailer 2. Thus, in some embodiments, barrier or spill gate 110 may be included in the installation to retain any liquid that leaks from tank 70 into trailer 2 so as not to contaminate the environment. Vertical supports 112A-B are mounted to sidewalls 6 and 8 of trailer 2, respectively, and horizontal channel 114 is mounted to floor 3 of trailer 2 to receive a generally rectangular liquid resistant panel, e.g., panel 116, in at least substantial sealing relationship with the body of trailer 2. A seal (e.g., rubber element) may be arranged between panel 116 and horizontal channel 114. In some embodiments, horizontal channel 116 includes shallow ramp 118 so that dry cargo may be easily wheeled or otherwise moved over horizontal channel 114 in the dry cargo configuration of liquid transporting tank system 10.

Figure 3:
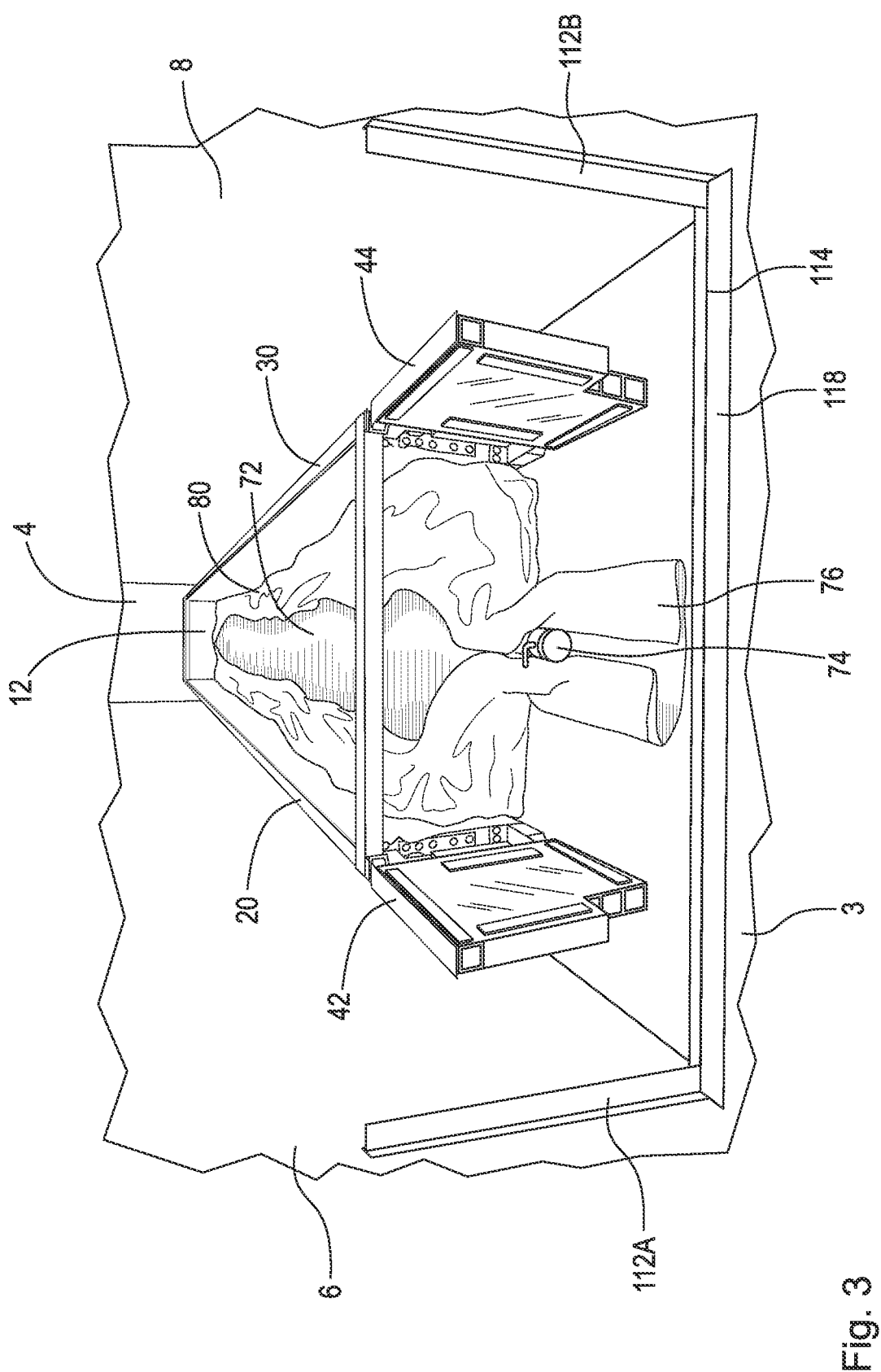
FIG. 3 is a rear view of the trailer of FIG. 1 showing the liner being deployed for transporting liquid cargo.

As shown in FIG. 3, gate portions 42 and 44 of the rear wall 40 are in open positions. In some embodiments, the tank is lined with a reusable, relatively thick gauge liner, e.g., liner 80, and liner 80 may be formed from a variety of flexible, tear resistant material such as a 12 mil vinyl plastic material. In some embodiments, liner 80 covers the bottom and sidewalls of the tank thereby partially surrounding bladder 72, while in some embodiments, liner 80 completely surrounds bladder 72 and may be closed with a closure such as a zipper at the top. In some embodiments, the material from which liner 80 is formed is thick enough so that it can be welded to fit the configuration of the tank. In some embodiments, plastic cover 76 is integrally formed with liner 80. In some embodiments, plastic cover 76 is separate from liner 80.

In some embodiments, a thinner gauge 2-5 mil disposable liner, for example, bladder 72, is disposed within the outer liner, e.g., liner 80. In some embodiments, bladder 72 is formed from a two-ply polypropylene material. It should be appreciated that the material used to form bladder 72 should be selected for compatibility with the fluid transported therein, e.g., food grade material for transporting milk. It should be further appreciated that bladder 72 contains the transported liquid while liner 80 contains and protects bladder 72.

FIGS. 6-9 are various cross-sectional views taken along the length of liquid transporting tank system 10, generally along line 6-6 in FIG. 2, having baffles 90A and 90B disposed therein. Baffles 90A and 90B are generally V-shaped in configuration but include a flat or nearly flat bottom substantially parallel to the bottom of the tank. Baffles 90A and 90B each have an interior supporting structure including two or more generally rigid angled elements, e.g., elements 96A-B, to which surface layer 98 (e.g., such as metal sheet) is attached. In some embodiments, transverse bracing element 100 is connected between the two supporting elements.

While the present disclosure liquid transporting tank system described above can perform successfully in a variety of applications, improved performance may be obtained by providing energy absorbing elements within the tank. For example, in some embodiments, one or more energy absorbing layers 102 are provided in the tank attached to front wall 12 and/or rear wall 40 (see FIG. 9). Moreover, baffles 90A and 90B may include energy absorbing materials on the forward and aft facing walls of each baffle. The energy absorbing layers can be made from open or closed cell foam, or any other suitable material capable of absorbing the energy of shifting liquid within the tank, and may be formed in various thicknesses such as 2-4 inches, or greater. While foam and compliant materials provide significant advantages in some embodiments of the disclosure, other energy absorbing arrangements such as those including shock absorber 104 may also be used (see FIG. 9).

Figure 16:
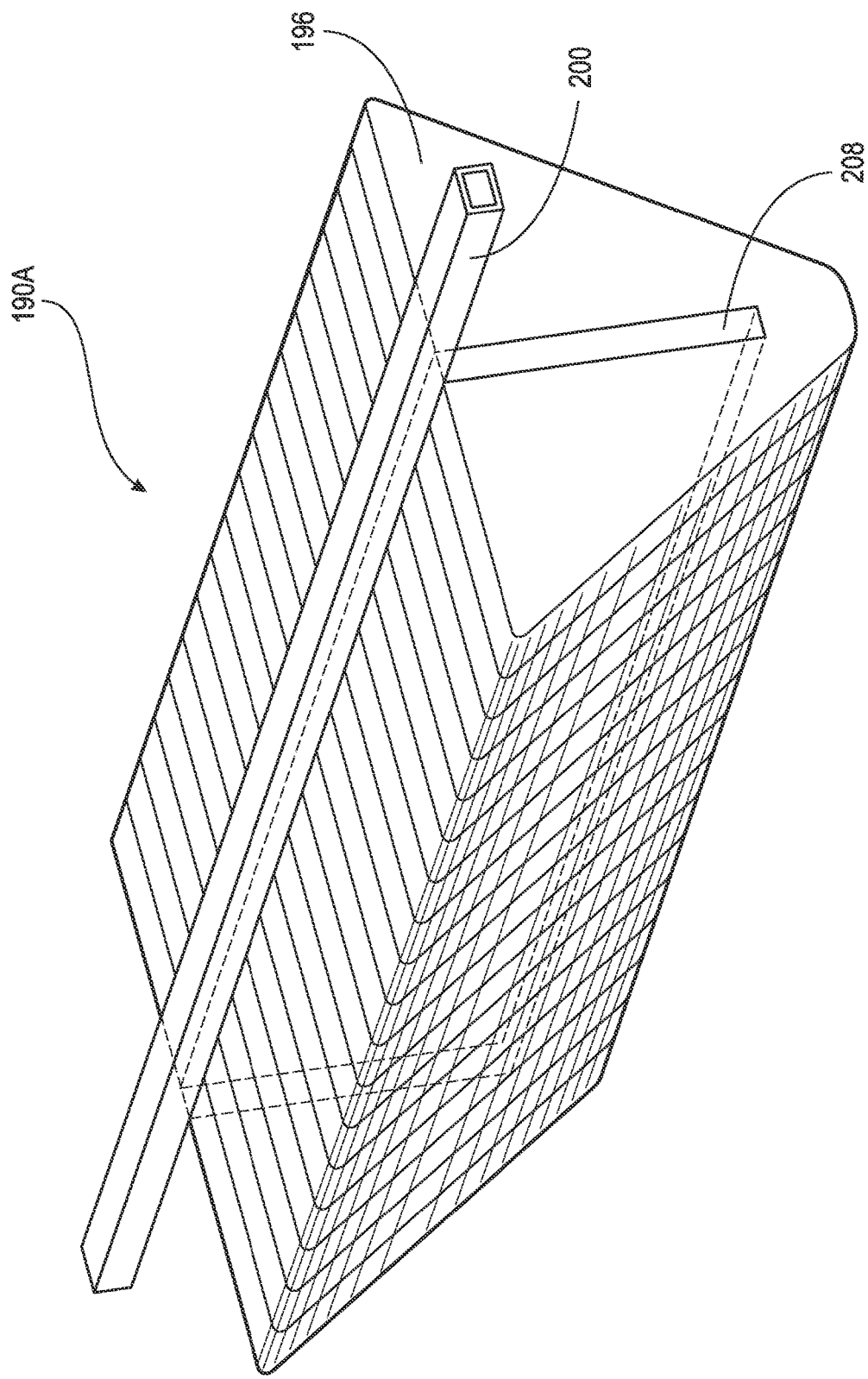
FIG. 16 is a perspective view of a baffle.
Figure 17:
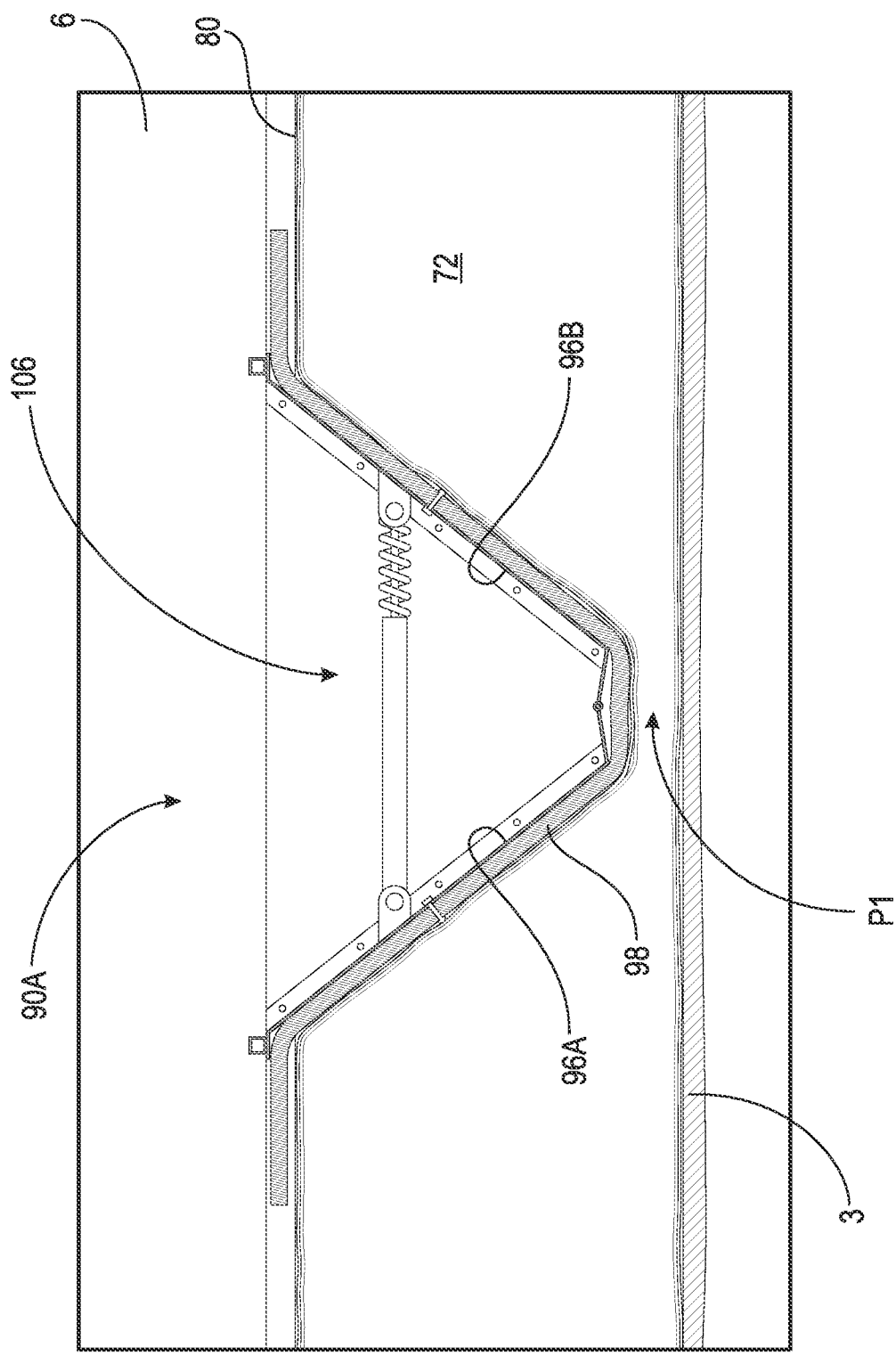
FIG. 17 is an alternate enlarged view of one of the baffles, taken generally at detail 17 in FIG. 6.
Figure 18:
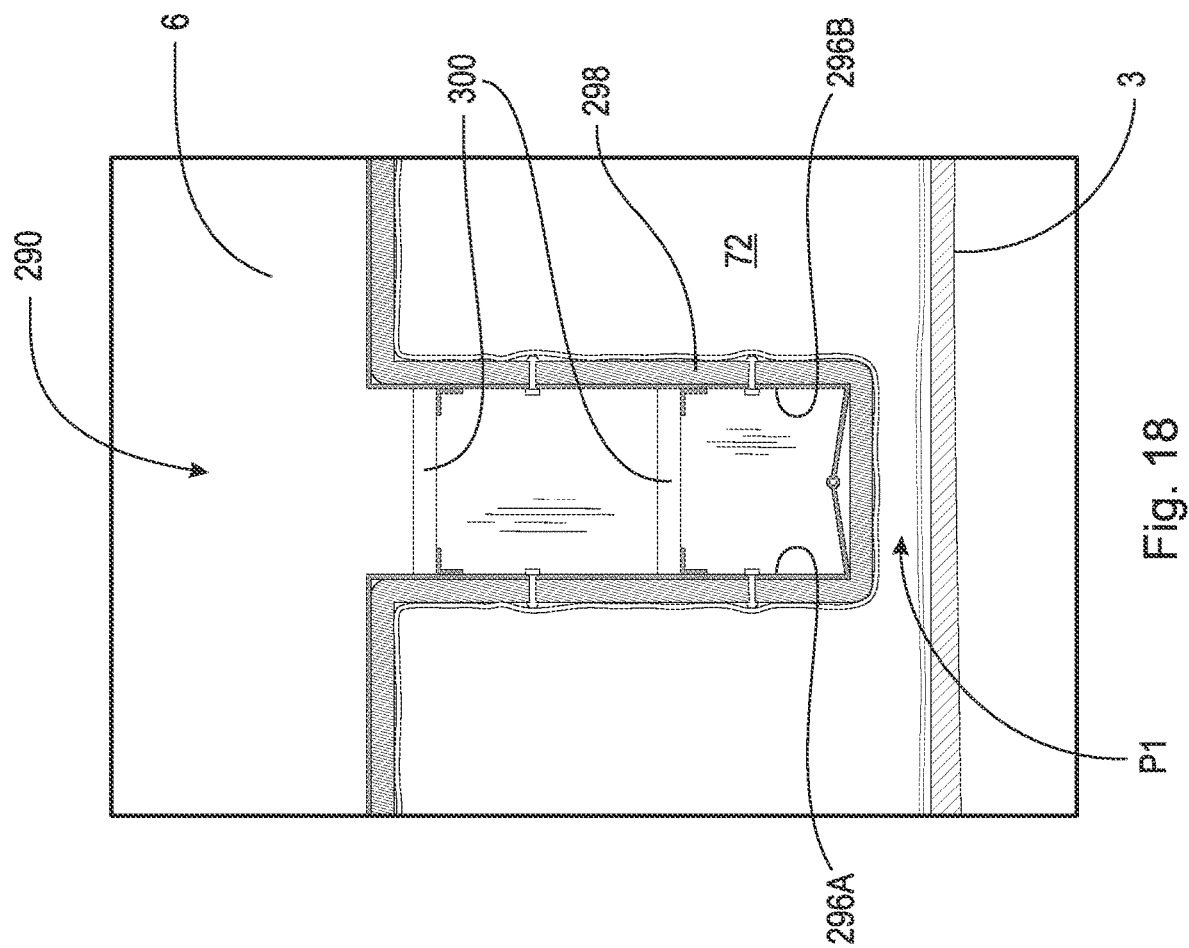
FIG. 18 is a cross-sectional view of a baffle.
Figure 19:
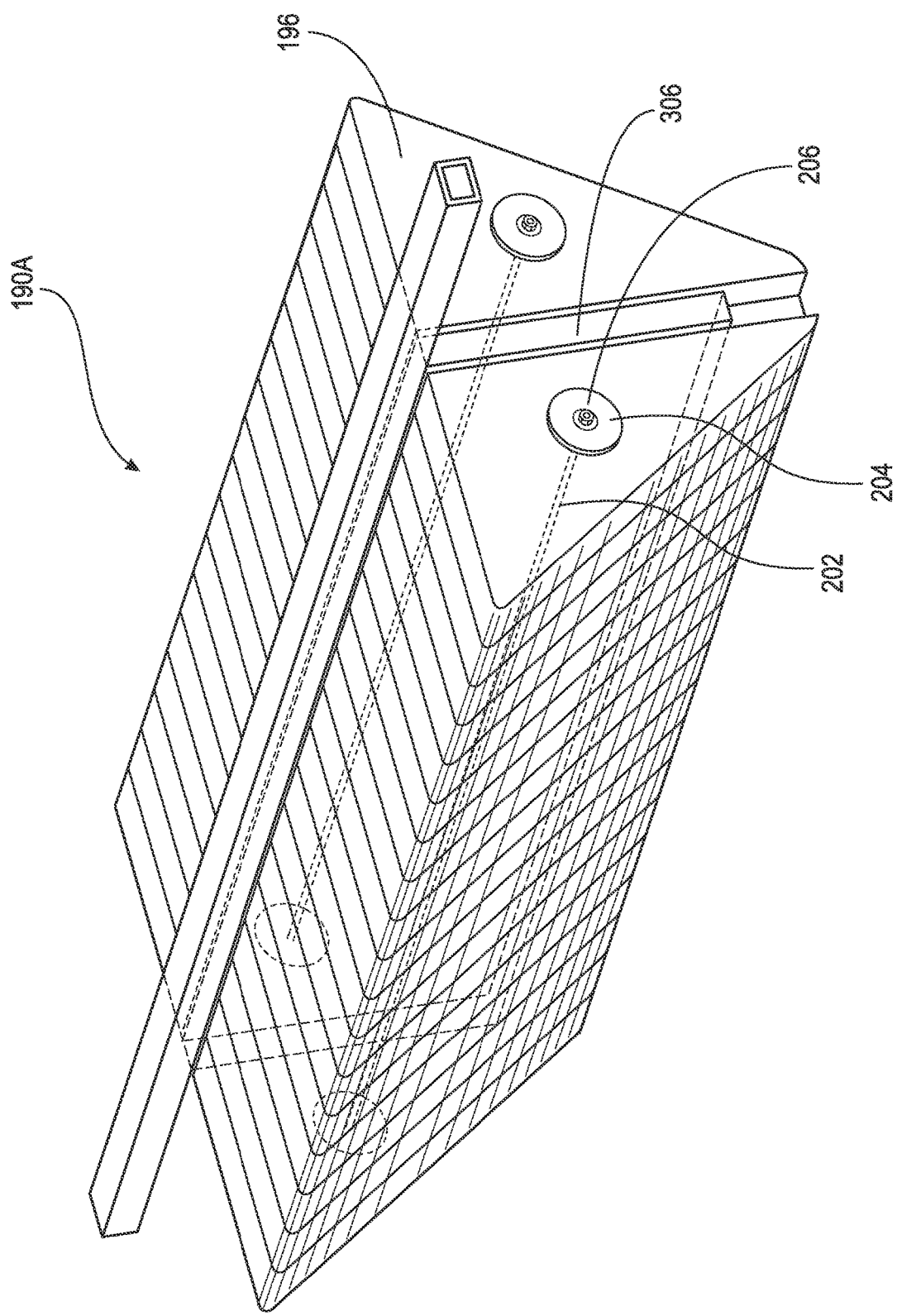
FIG. 19 is a perspective view of a baffle.

It should be appreciated that the baffles used in the various embodiments of the present disclosure may take a variety of forms. For example, in some embodiments, baffles 190A and 190B comprise a rigid frame, e.g., frame 196, and resilient material 198 affixed to all surfaces of frame 196 that contact the bladder 72 and/or liner 80, e.g., foam (see FIGS. 10-15). In some of these embodiments, the baffle further comprises at least one of the following: brace 100; and, shock 106, wherein these added elements strengthen the overall structure of the bladder and/or provide force damping (see FIGS. 7 and 17). In some embodiments, the baffles are formed from a monolithic resilient member, e.g., a single piece of open cell foam to form the desired shape, for example a triangular prism shape. In some embodiments, the baffles are formed from a plurality of resilient members affixed to each other, for example by an adhesive, and/or held together with a mechanical means such as a tie strap, for example, tie strap 200 in FIG. 16, rod/shaft having threaded ends, for example, rod 202 having washers 204 and nuts 206 secured at each end of rod 202, as shown in FIG. 19. In some of the embodiments of the foregoing baffles, each baffle may further include a rigid core, for example, insert 208 (see FIG. 16). It should be appreciated that insert 208 may be formed from a variety of materials, including combinations of those materials, based on the requirements of the overall system, e.g., volume of transported liquid, density of transport liquid, etc. Suitable materials include, but are not limited to, polymer, solid aluminum, solid stainless steel, aluminum honeycomb core, polymer honeycomb core, a honeycomb core (polymer and/or metallic) encased in a subsequent polymer and/or metallic material.

It should be appreciated that baffles used in the present disclosure may be formed in a variety of shapes. In some embodiments, the present disclosure includes baffles having a generally V-shaped cross-section. However, in some embodiments, the bottom region of the V-shape may be made convex, flat or concave. Moreover, in some embodiments, the generally V-shaped cross section may comprise a unique geometry or angle at each side, e.g., the surface facing the rear of trailer 2 may be at 30 degrees below a horizontal plane and the surface facing the front of trailer 2 may be at 45 degrees below a horizontal plane. Still further, in some embodiments of the present system, a baffle is included at the front most position of trailer 2, e.g., baffle 290. In those embodiments, the surface facing the front of trailer 2 may be at 90 degrees below a horizontal plane and the surface facing the rear of trailer 2 may be at 45 degrees (or 90 degrees) below a horizontal plane. The foregoing angular values are only examples of the possible orientations of the surfaces and are not intended to be limiting.

Figure 20:
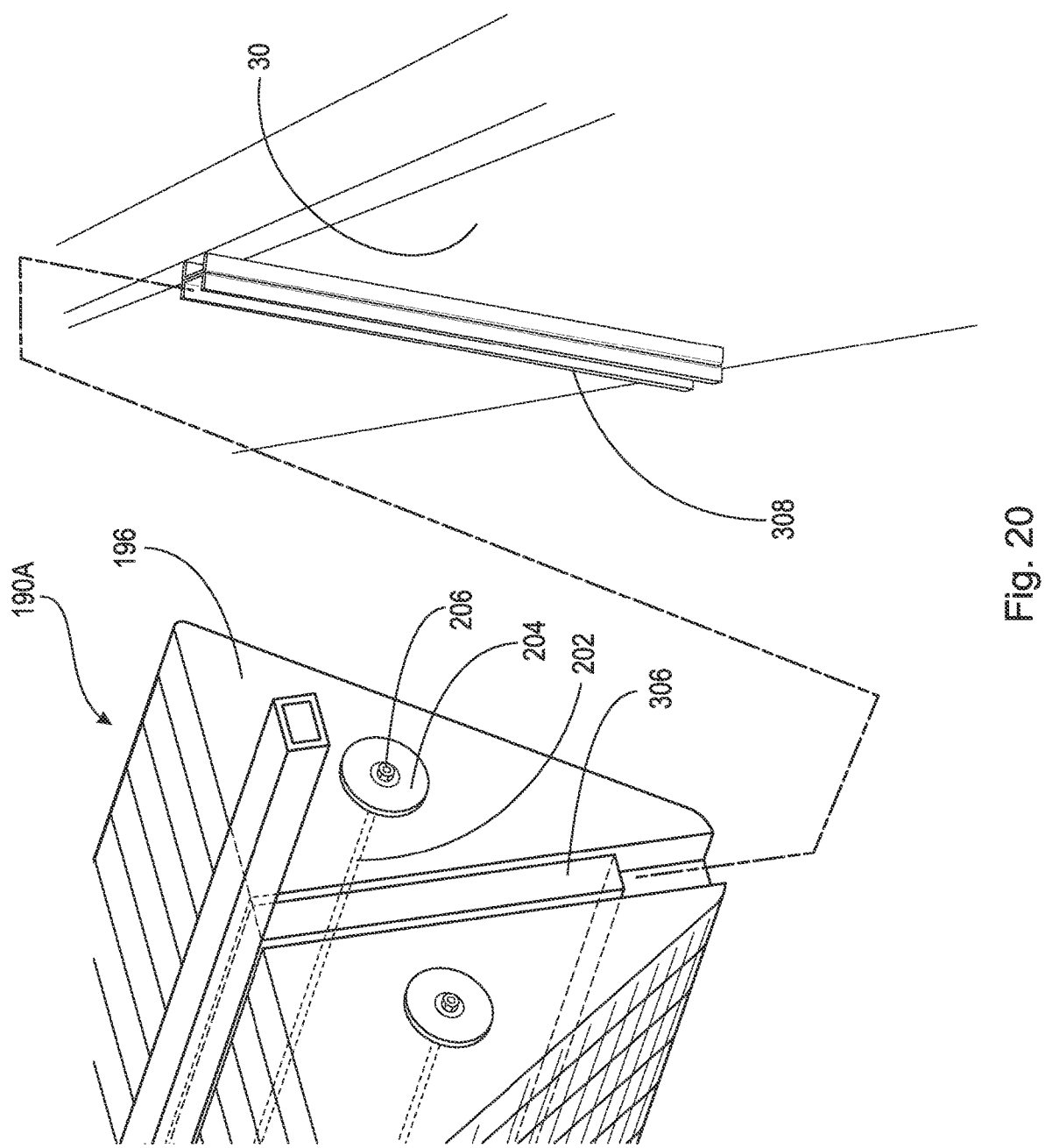
FIG. 20 is a perspective view of a baffle and a side wall connector.
Figure 21:
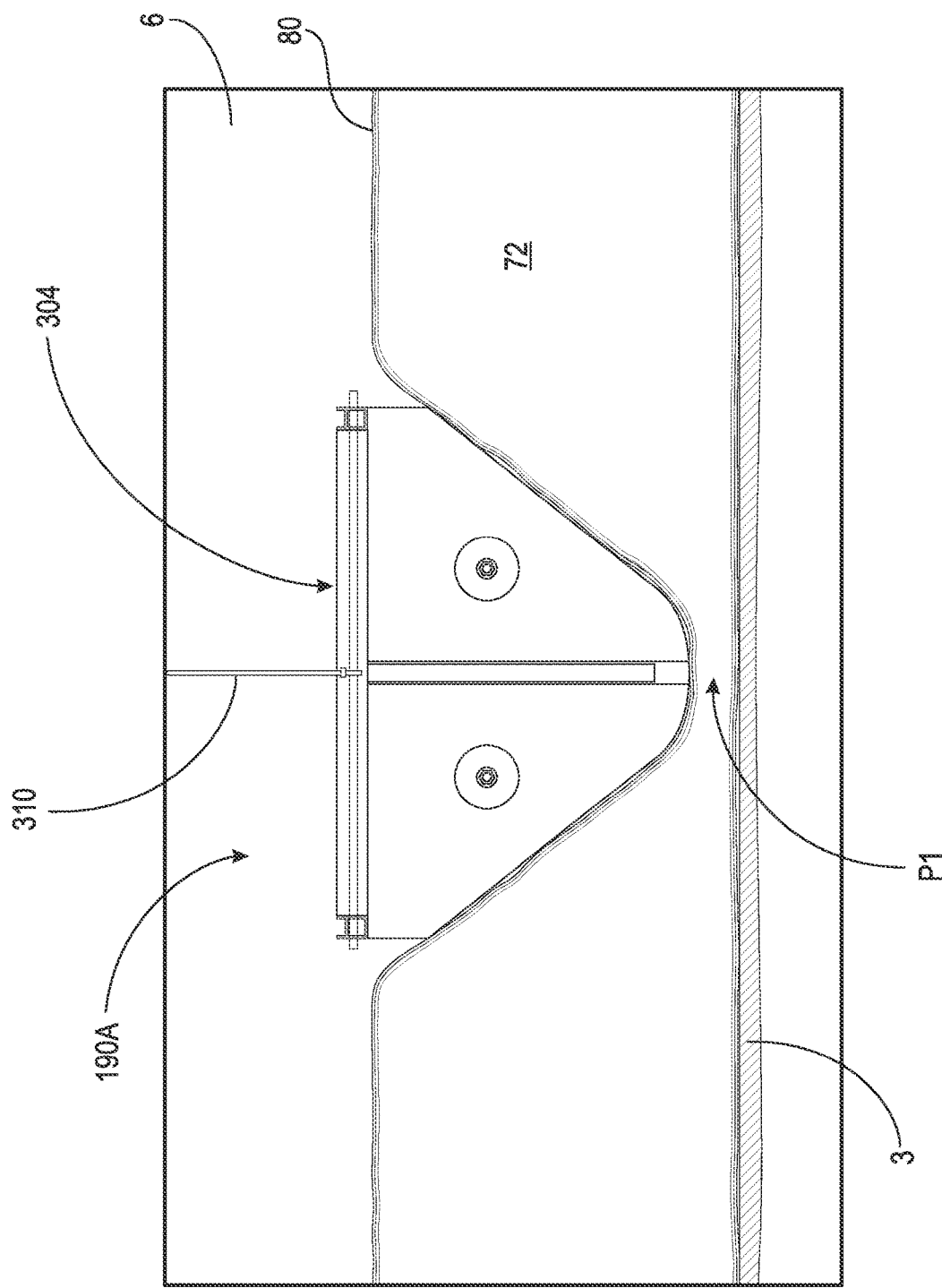
FIG. 21 is a side elevational view of a baffle in a deployed position in a trailer.
Figure 22:
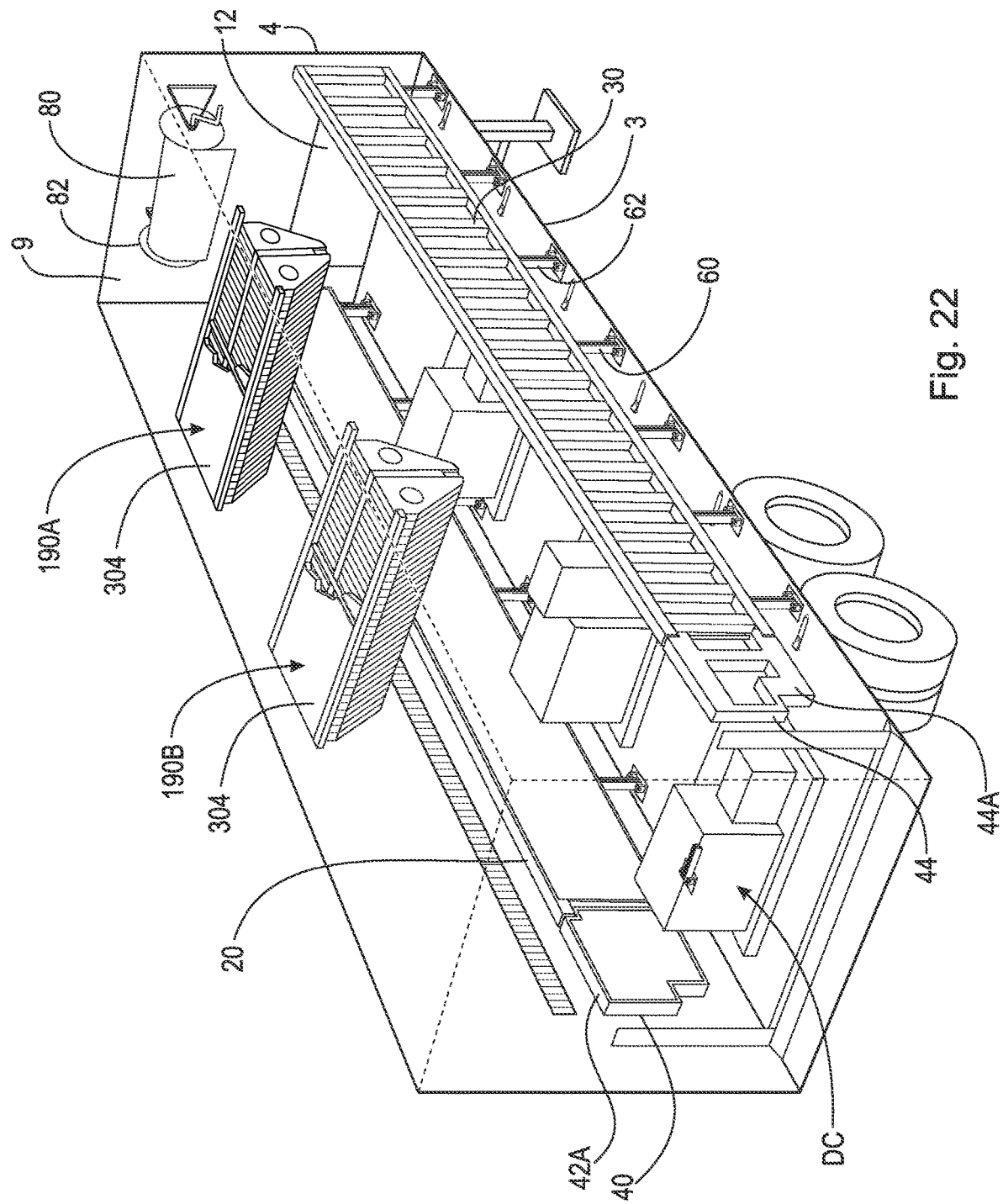
FIG. 22 is a perspective view of a tractor trailer, partly in phantom, showing a tank in accordance with another aspect of this disclosure configured for transporting liquid cargo; and, FIG. 23 is a perspective view of the trailer of FIG. 22 configured for transporting liquid cargo.
Figure 23:
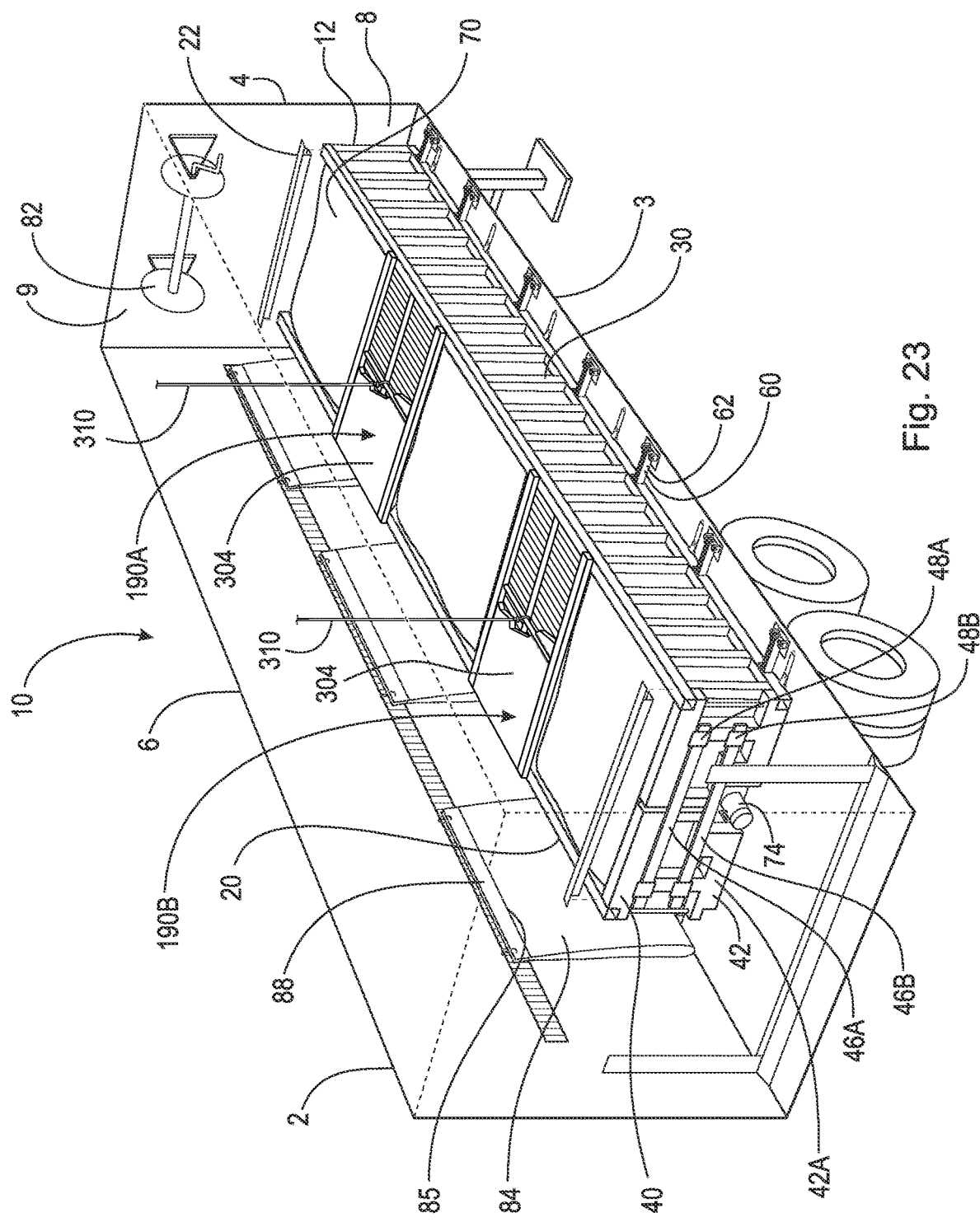

Baffles used in the present disclosure may be secured to sidewalls 20 and/or 30 of liquid transporting tank system 10, sidewalls 6 and/or 8 of trailer 2, or held in position by rail 306 which is in turn secured to sidewalls 20 and/or 30 of liquid transporting tank system 10 via guide 308 (see FIG. 20). In some embodiments, arms 192 are positioned over a portion of the top of baffles 190A-B and secured to sidewalls 20 and/or 30 thereby retaining baffles 190A-B in position to damp movement of liquid being transported in liquid transporting tank system 10 (see FIG. 10). Arms 192 may be positioned at the ends of each of baffles 190A-B, may be positioned in the central region of baffles 190A-B, or may be positioned between the ends of each of baffles 190A-B and the central region thereof. Combinations of the foregoing arrangements are also possible, as well as use of a single arm to support baffles 190A and/or 190B. Furthermore, in some embodiments, liquid transporting tank system 10 comprises covers 304 secured over baffles 190A and/or 190B (see FIGS. 22-23). Covers 304 may fully cover each of baffles 190A-B or may cover only a portion of each of baffles 190A-B. Cover 304 may be secured to sidewalls 20 and/or 30, or alternatively may be secured to floor 3 of trailer 2. Cover 304 may be fixed without further adjustment or may be tensioned with a ratcheting system, for example tensioned with a come along ratchet. In some embodiments, cables 310 are connected to cover 304 and/or baffles 190A and/or 190B and are arranged to lift/lower baffles 190A and/or 190B (see FIG. 21).

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Trailer
3 Floor
4 Front wall
6 Side wall
8 Side wall
9 Ceiling
10 Liquid transporting tank system
12 Front wall
20 Side wall
22 Supporting beam
30 Side wall
40 Rear wall
42 Gate portion
42A Rear surface
44 Gate portion
44A Rear surface
46A Transverse bar
46B Transverse bar
48A Support(s)
48B Support(s)
50 Opening
60 Movable supports
62 Rods
70 Tank
72 Bladder
74 Port (or fitting)
76 Plastic cover
80 Liner
82 Spool
84 Sheets
85 Edges
86 Straps (or cables)
88 Elongated bar
90A Baffle
90B Baffle
92 Cable(s)
94 Spool(s)
96A Element
96B Element
98 Surface layer
100 Bracing element
102 Energy absorption layer
104 Shock absorber
106 Shock
110 Barrier
112A Vertical support
112B Vertical support
114 Horizontal channel
116 Panel
118 Ramp
190A Baffle
190B Baffle
192 Arm(s)

196 Frame
198 Resilient material
200 Tie strap
202 Rod(s)
204 Washer(s)
206 Nut(s)
208 Insert(s)
290 Baffle
296A Element
296B Element
298 Surface layer
300 Brace(s)
304 Cover
306 Rail
308 Guide
310 Cable(s)
P1 Passage
P2 Passage
DC Dry cargo

What is claimed is:

1. A collapsible liquid storage tank for use in an elongated trailer for selectively carrying solid freight and bulk liquid freight, comprising:
a first side frame extending longitudinally with respect to the elongated trailer and movably attached to the elongated trailer, the first side frame is configured for movement between a retracted position against a first trailer side wall for carrying solid freight and a deployed position for carrying liquid freight;
a second side frame extending longitudinally with respect to the elongated trailer and movably attached to the elongated trailer, the second side frame is configured for movement between a retracted position against a second trailer side wall for carrying solid freight and a deployed position, for carrying liquid freight, parallel to and spaced apart from the first side frame;
a rear frame positioned between the first and second side frames when the first and second side frames are in the deployed position;
a liner having side walls connected to the first and second side frames and the rear frame;
a liquid impermeable bladder disposed within the liner; and,
at least one baffle operatively arranged to be positioned between the first and second side frames.

2. The collapsible liquid storage tank of claim 1, wherein the at least one baffle is configured to absorb energy from liquid disposed in the storage tank.

3. The collapsible liquid storage tank of claim 1, wherein the at least one baffle comprises a damper for absorbing energy from bulk liquid freight moving within the liquid impermeable bladder.

4. The collapsible liquid storage tank of claim 3, wherein the damper comprises a compliant material disposed on a surface of the at least one baffle.

5. The collapsible liquid storage tank of claim 4, wherein the compliant material is an open cell foam or a closed cell foam.

6. The collapsible liquid storage tank of claim 1, wherein the at least one baffle comprises a plurality of layers of a compliant material.

7. The collapsible liquid storage tank of claim 6, wherein the at least one baffle further comprises a rigid core disposed within the plurality of layers of the compliant material.

8. The collapsible liquid storage tank of claim 1, wherein the at least one baffle is generally V-shaped in longitudinal cross section.

9. The collapsible liquid storage tank of claim 1, wherein the at least one baffle comprises two oppositely disposed longitudinal sides and each longitudinal side comprises a layer of a compliant material disposed thereon.

10. The collapsible liquid storage tank of claim 1, comprising a first lift connected between the trailer and the first side frame for moving the first side frame between the retracted position and the deployed position.

11. The collapsible liquid storage tank of claim 10, comprising a second lift connected between the trailer and the second side frame for moving the second side frame between the retracted position and the deployed position.

12. The collapsible liquid storage tank of claim 1, further comprising an outlet port in fluid connection with the impermeable bladder and centrally positioned therein.

13. The collapsible liquid storage tank of claim 12, wherein the outlet port is configured to be removably attached to filling and discharge piping.

14. A collapsible liquid transporting tank system for use in an elongated trailer, comprising:
a first side wall movably connected to the elongated trailer;
a second side wall movably connected to the elongated trailer;
at least one gate portion connected to one of the first side wall and the second side wall, the at least one gate portion forming a rear wall; and,
a bladder arranged within the first side wall, the second side wall, and the rear wall when the first and second side walls are in a deployed position.

15. The collapsible liquid transporting tank system as recited in claim 14, further comprising at least one baffle operatively arranged to engage the bladder.

16. The collapsible liquid transporting tank system as recited in claim 15, wherein the at least one baffle is retractable from a wall and/or a ceiling of the elongated trailer.

17. The collapsible liquid transporting tank system as recited in claim 14, further comprising a liner substantially arranged around the bladder.

18. The collapsible liquid transporting tank system as recited in claim 14, wherein the rear wall comprises an opening for a port of the bladder.

19. The collapsible liquid transporting tank system as recited in claim 14, further comprising a front wall, wherein in a deployed position, the first side wall, the second side wall, the front wall, and the rear wall form an enclosure, the bladder being arranged within the enclosure.

20. A collapsible liquid storage tank for use in an elongated trailer for selectively carrying solid freight and bulk liquid freight, comprising:
a first side frame extending longitudinally with respect to the elongated trailer and movably attached to the elongated trailer, the first side frame is configured for movement between a retracted position against a first trailer side wall for carrying solid freight and a deployed position for carrying liquid freight;
a second side frame extending longitudinally with respect to the elongated trailer and movably attached to the elongated trailer, the second side frame is configured for movement between a retracted position against a second trailer side wall for carrying solid freight and a deployed position, for carrying liquid freight, parallel to and spaced apart from the first side frame;
a rear frame positioned between the first and second side frames when the first and second side frames are in the deployed position;

a flexible liner having side walls connected to the first and second side frames;
a liquid impermeable bladder disposed within the liner; and,
a plurality of layers of energy absorbing material disposed on and within an upper surface of the bladder arranged to form a plurality of sections of the bladder.

\* \* \* \* \*